(12) United States Patent
Nishi et al.

(10) Patent No.: US 6,275,530 B1
(45) Date of Patent: Aug. 14, 2001

(54) IMAGE CODER AND IMAGE CODING METHOD, AND IMAGE DECODER AND IMAGE DECODING METHOD, AND QUANTIZATION CONTROL METHOD AND INVERSE QUANTIZATION CONTROL METHOD, AND DATA RECORDING MEDIUM

(75) Inventors: Takahiro Nishi, Neyagawa; Shinya Kadono, Kobe, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/091,678

(22) PCT Filed: Nov. 7, 1997

(86) PCT No.: PCT/JP97/04052

§ 371 Date: Aug. 11, 1998

§ 102(e) Date: Aug. 11, 1998

(87) PCT Pub. No.: WO98/21895

PCT Pub. Date: May 22, 1998

(30) Foreign Application Priority Data

Nov. 8, 1996 (JP) .................................................. 8-296103
Nov. 28, 1996 (JP) .................................................. 8-317343
Feb. 7, 1997 (JP) .................................................. 9-024897

(51) Int. Cl.⁷ ............................. H04N 7/36; H04N 7/50
(52) U.S. Cl. ................................ 375/240.12; 375/240.04; 375/240.08; 375/240.1; 375/240.14
(58) Field of Search .................................. 348/409, 409.1; 375/240.12, 240.14, 240.04, 240.08, 240.1; H04N 7/36, 5/50

(56) References Cited

U.S. PATENT DOCUMENTS

| | | | |
|---|---|---|---|
| 5,144,424 | 9/1992 | Savatier | 375/240.03 |
| 5,598,213 | 1/1997 | Chung et al. | 375/240.04 |
| 6,188,796 | * 2/2001 | Kadono | 375/240.12 X |

FOREIGN PATENT DOCUMENTS

| | | | |
|---|---|---|---|
| 0 424060 A2 | 4/1991 | (EP) | H04N/7/133 |
| 0 711 078 A2 | 5/1996 | (EP) | H04N/7/26 |

(List continued on next page.)

OTHER PUBLICATIONS

Wang et al., "Representing Moving Images with Layers," IEEE Transactions on Image Processing, September 1994, vol. 3 No. 5, pp. 625–638.

*Primary Examiner*—Howard Britton
(74) *Attorney, Agent, or Firm*—Parkhurst & Wendel, L.L.P.

(57) ABSTRACT

An image coding apparatus 1 of the present invention comprises a coding controller 112a for generating a transparency coding parameter 121 for controlling coding process for transparency signals on the basis of a pixel value coding parameter 104 for controlling coding process for pixel value signals and performs coding process for transparency signals 102 on the basis of the transparency coding parameter 121.

The image coding apparatus 1 above constructed can control an image quality obtained from transparency signals of each image included in a composite image according to an image quality of pixel value signals of each image of the composite image, and thus it is possible to reduce redundant information of coded transparency signals 106 resulting from coding the transparency signals without degrading an image quality of each image, thereby implementing recording and transmission of image signals with fewer bits with no degradation of image quality.

23 Claims, 15 Drawing Sheets

FOREIGN PATENT DOCUMENTS

| | | | | |
|---|---|---|---|---|
| 0 719 049 A2 | 6/1996 | (EP) | ................................ | H04N/7/24 |
| 0 739 141 A2 | 10/1996 | (EP) | ................................ | H04N/7/32 |
| 0 785689 A2 | 7/1997 | (EP) | ................................ | H04N/7/50 |
| 5-227525 | 9/1993 | (JP) | ................................ | H04N/7/137 |
| 7-274172 | 10/1995 | (JP) | ................................ | H04N/7/133 |
| 8-140096 | 5/1996 | (JP) | ................................ | H04N/7/137 |
| 8-172631 | 7/1996 | (JP) | ................................ | H04N/7/32 |
| WO 96/13938 | 5/1996 | (WO) | ................................ | H04N/7/26 |
| WO 96/26612 | 8/1996 | (WO) | ................................ | H04N/7/30 |

\* cited by examiner

IMAGE CODER AND IMAGE CODING METHOD, AND IMAGE DECODER AND IMAGE DECODING METHOD, AND QUANTIZATION CONTROL METHOD AND INVERSE QUANTIZATION CONTROL METHOD, AND DATA RECORDING MEDIUM

TECHNICAL FIELD

The present invention relates to an image coding apparatus and an image coding method, an image decoding apparatus and an image decoding method, a quantization control method and an inverse quantization control method, and a data recording medium and, more particularly, to coding and decoding processes in which image signals are recorded or transmitted with fewer bits and without degrading an image quality, and a recording medium which stores a program for implementing the coding process or decoding process.

BACKGROUND ART

Conventionally, there are many types of methods of coding image signals including DPCM (Differential Pulse Code Modulation) or DCT (Discrete Cosine Transform) and so forth. In particular, the latter is well known for high efficiency in coding of natural images such as a scenery and adopted in an international standard on multimedia coding such as JPEG (Joint Photographic Coding Experts Group) or MPEG (Moving Picture Experts Group).

Meanwhile, with recent improvement of computer technologies and image processing techniques, composite images resulting from compositing plural images using chroma key processing or computer graphics have been widely used. The composite image includes an edge whose pixel value changes sharply and has characteristics which significantly differ from those of conventional natural image, e.g., high spatial resolution.

In coding of the above-described composite image, if image signals corresponding to images to be composited are coded together with signals indicating a composite ratio for each image, decoding side can perform decoding process for a desired image among plural images constituting a composite image as well as decoding process for the composite image itself. In this case, the resultant composite image is effective in interactive multimedia (interactive processing to plural images related to each other and provided simultaneously), but a special coding process for coding the signals indicating a composite ratio is required.

Signals indicating this ratio of composition represent a degree of transparency of a background with respect to a foreground when a prescribed image and the other image are assumed to be a foreground and a background, respectively, for formation of a composite image. The signals indicating composite ratio are set for each image and referred to as transparency signals to distinguish them from pixel value signals used for color display of images.

More specifically, transparency signals of individual images (objects) constituting a composite image to be displayed on a display screen have a characteristic in which values thereof are almost equal inside the objects and vary greatly around the boundaries thereof, which characteristic is different from that of pixel value signals for displaying natural images; in a prior art coding method, however, coding is performed to transparency signals using the coding method for pixel value signals indicating a pixel value of an image and the same parameters for coding.

In addition, in coding of image signals, image signals of higher image quality require more amount of code to be used for the coding process. In the decoding side, since one image (object) is regenerated by decoding pixel value signals and transparency signals together, an image quality of a regenerated image is degraded if an image quality of a regenerated image formed by one type of signals is high image quality and that of the regenerated image formed by the other type of signals is low.

When performing data coding process, in general, high coding efficiency is not obtained unless a coding method corresponding to a quality of data to be coded is used. However, in the prior art coding method, the coding method and parameters used in coding process for pixel value signals are also used in coding process for transparency signals, which causes problems including an unnecessarily high image quality of transparency signals in comparison with that of pixel value signals and the coding method being not suitable for coding process for transparency signals, resulting in that an enormous amount of code is required for coding process for transparency signals.

The present invention is introduced to resolve the above-described problems, and its object is to provide an image coding apparatus and an image coding method capable of optimally controlling a coding method and a coding parameter for transparency signals according to a coding parameter for pixel value signals or independently of the coding parameter for pixel value signals.

It is another object of the present invention to provide an image decoding apparatus and an image decoding method capable of properly decoding coded transparency signals resulting from optimal coding process for transparency signals in accordance with the coding parameter for pixel value signals or optimal coding process for transparency signals independently of the coding parameter for pixel value signals.

It is still another aspect of the present invention to provide a quantization control method which is suitable for an optimal coding process for transparency signals according to the coding parameter of pixel value signals and an inverse quantization control method which is suitable for a decoding process for the coded transparency signals acquired from the coding process.

It is further object of the present invention to provide a data recording medium which stores a program for implementing in a computer an optimal coding process for transparency signals on the basis of the coding parameter of pixel value signals or independently of the coding parameter of pixel value signals, a decoding process for the coded transparency signals resulting from the coding process, and a quantization process which is suitable for the coding process and an inverse quantization process which is suitable for the decoding process.

DISCLOSURE OF THE INVENTION

According to the present invention, an image coding apparatus which receives pixel value signals indicating a pixel value of an image and transparency signals indicating a composite ratio of pixel value for compositing the image and another image as input signals, and performs coding to the pixel value signals and the transparency signals, and the image coding apparatus comprises: a pixel value encoder for coding the pixel value signals to output coded pixel value signals, and outputting a pixel value coding parameter indicating control information on coding process for the pixel value signals; a coding controller for generating a transparency coding parameter indicating control information on coding process for the transparency signals on the basis of the pixel value coding parameter, and outputting transparency coding control signals indicating a relation between the pixel value coding parameter and the transparency coding parameter; and a transparency encoder for coding the transparency signals in accordance with the transparency coding parameter to output coded transparency signals.

In accordance with the image coding apparatus constructed above, a transparency coding parameter for controlling coding process for transparency signals is generated on the basis of the pixel value coding parameter for controlling coding process for the pixel value signals, and coding process is performed to transparency signals on the basis of the transparency coding parameter; therefore, according to an image quality obtained from the pixel value signals of the individual images of a composite image, it is possible to control an image quality obtained from the transparency signals of the individual images. Thereby, redundant information of the coded transparency signals resulting from coding the transparency signals can be reduced without degrading an image quality of each image, enabling recording or transmission of image signals including pixel value signals and transparency signals with fewer bits and with no degradation of an image quality.

According to the present invention, in the image coding apparatus of the transparency encoder includes: a storage means for storing decoded transparency signals resulting from decoding the coded transparency signals; a prediction signal producing unit for predicting transparency signals as object of coding process to produce transparency prediction signals on the basis of the decoded transparency signals stored in the storage means; a subtracter for subtracting the transparency prediction signals from the transparency signals as object of coding process to output transparency difference signals; a difference encoder for coding the transparency difference signals to output coded transparency difference signals; a local decoder for decoding the coded transparency difference signals to output decoded transparency difference signals; and an adder for adding the decoded difference signals to the transparency prediction signals and outputting a resulting addition value to the storage means as decoded transparency signals.

In accordance with the image coding apparatus constructed above, the transparency coding parameter is generated on the basis of the pixel value coding parameter for controlling coding process for the pixel value signals, and coding process is performed to difference signals obtained from transparency signals and transparency prediction signals on the basis of the transparency coding parameters; therefore, if difference coding process is performed to transparency signals, an image quality obtained from transparency signals of each image can be controlled according to an image quality obtained from pixel value signals of each image within a composite image.

According to the present invention, in the image coding apparatus of the pixel value encoder includes a pixel value frequency converter for performing frequency conversion to the pixel value signals, and a pixel value quantizer for quantizing an output of the pixel value frequency converter; the transparency encoder includes a transparency frequency converter for performing frequency conversion to the transparency signals, and a transparency quantizer for quantizing an output of the transparency frequency converter; and a value of a quantization step for use in quantizing the transparency signals in the transparency quantizer is controlled on the basis of a value of a quantization step for use in quantizing pixel value signals in the pixel value quantizer.

In accordance with the image coding apparatus constructed above, a value of a quantization step used for quantizing transparency signals is controlled on the basis of a value of a quantization step for use in quantizing pixel value signals, whereby redundant information of coded transparency signals can be reduced by using a simple method of controlling quantization step, without degrading an image quality of a composite image.

In accordance with the present invention, the pixel value encoder includes a pixel value frequency converter for performing frequency conversion to the pixel value signals, and a pixel value quantizer for quantizing an output of the pixel value frequency converter; the difference encoder includes a transparency frequency converter for performing frequency conversion to the transparency difference signals and a transparency quantizer for quantizing an output of the transparency frequency converter; and a value of a quantization step for use in quantizing frequency components of the transparency difference signals in the transparency quantizer is controlled on the basis of a value of a quantization step for use in quantizing pixel value signals in the pixel value quantizer.

In accordance with the image coding apparatus constructed above, when quantizing transparency difference signals, i.e., difference signals between transparency signals and transparency prediction signals, a value of a quantization step used for the quantization is controlled on the basis of a value of a quantization step for use in quantizing pixel value signals; therefore, redundant information of coded transparency difference signals can be reduced without degrading an image quality of a composite image by using a simple method of controlling the quantization step.

According to the present invention, the pixel value encoder includes a pixel value frequency converter for performing frequency conversion to the pixel value signals to output plural pixel value frequency components, and a pixel value quantizer for quantizing each of the plural pixel value frequency components; and the transparency encoder includes a transparency frequency converter for performing frequency conversion to the transparency signals to output plural transparency frequency components, and a transparency quantizer for quantizing each of the plural transparency frequency components; and, a value of a quantization step for use in quantizing each transparency frequency component in the transparency quantizer is controlled for each transparency frequency component on the basis of control information for controlling quantization process for pixel value frequency components in the pixel value quantizer.

In accordance with the image coding apparatus constructed above, when quantizing each transparency frequency component resulting from frequency conversion to transparency signals, a value of a quantization step used therefor is controlled for each transparency frequency component on the basis of control information for controlling quantization process for pixel value frequency components in the pixel value quantizer; therefore, the value of the quantization step is controlled to detail, and thus redundant information of coded transparency signals can be reduced effectively without degrading an image quality of a composite image.

According to the present invention, the pixel value encoder includes a pixel value frequency converter for performing frequency conversion to the pixel value signals to output plural pixel value frequency components, and a pixel value quantizer for quantizing each of the plural pixel value frequency components; the difference encoder includes a transparency frequency converter for performing frequency conversion to the transparency difference signals to output plural transparency difference frequency components, and a transparency quantizer for quantizing each of the plural transparency difference frequency components; and, a value of a quantization step for use in quantizing each transparency difference frequency component in the transparency quantizer is controlled for each transparency difference frequency component on the basis of control information for controlling quantization process for each pixel value frequency component in the pixel value quantizer.

In accordance with the image coding apparatus constructed above, when quantizing transparency difference frequency components resulting from frequency conversion to the transparency difference signals, i.e., difference signals between transparency signals and transparency prediction signals, a value of a quantization step used therefor is controlled for each transparency difference frequency component on the basis of control information for controlling quantization process for pixel value frequency components in the pixel value quantizer; therefore, when performing difference coding process to transparency signals, a value of a quantization step therefor is controlled to detail, and thus redundant information of the coded transparency difference signals can be reduced more effectively without degrading an image quality of a composite image.

According to the present invention, a method of coding images in which not only pixel value signals indicating a pixel value of an image but transparency signals indicating a composite ratio of pixel value for compositing the image and another image are coded, and the method comprises the steps of coding the pixel value signals on the basis of a pixel value coding parameter indicating control information on coding process for the pixel value signals; deciding a transparency coding parameter indicating control information on coding process for the transparency signals on the basis of the pixel value coding parameter; and coding the transparency signals on the basis of the transparency coding parameter.

In accordance with the image coding apparatus constructed above, transparency signals are coded according to a state of coding process for pixel value signals; therefore, according to an image quality obtained from pixel value signals of the individual images of the composite image, it is possible to control an image quality obtained from transparency signals of the individual images, and thus redundant information of coded transparency signals resulting from coding transparency signals can be reduced with no degradation of an image quality of each image, resulting in recording or transmission of image signals including pixel value signals and transparency signals with fewer bits without degrading an image quality.

According to the present invention, an image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but a pixel value coding parameter indicating control information on coding process for the pixel value signals and transparency coding control signals indicating a relation between the pixel value coding parameter and a transparency coding parameter indicating control information on coding process for the transparency signals, and performs decoding to the coded pixel value signals and the coded transparency signals, and this apparatus comprises: a pixel value decoder for performing decoding to the coded pixel value signals in accordance with the pixel value coding parameter to output decoded pixel value signals; a decoding controller for generating the transparency coding parameter on the basis of the pixel value coding parameter and the transparency coding control signals and outputting the transparency coding parameter; and a transparency decoder for decoding the coded transparency signals in accordance with the transparency coding parameter to output decoded transparency signals.

In accordance with the image decoding apparatus constructed above, coded transparency signals resulting from coding transparency signals on the basis of the transparency coding parameter according to a coding process of pixel value signals are decoded on the basis of the transparency coding parameter; therefore, it is possible to properly decode coded transparency signals with an amount of coded signals suppressed so as to avoid degradation of an image quality of a composite image obtained from pixel value signals and transparency signals. As a result, it is possible to generate a composite image without degrading an image quality thereof by decoding coded pixel value signals and coded transparency signals.

According to the present invention, the transparency decoder includes a storage means for storing decoded transparency signals as an output thereof, and a difference decoder for decoding coded transparency difference signals resulting from coding transparency difference signals as difference between the transparency signals and the transparency prediction signals corresponding thereto, to output decoded transparency difference signals, and a prediction signal producing unit for producing transparency prediction signals corresponding to coded transparency difference signals as an object of decoding process, from decoded transparency signals stored in the storage means; and an adder for adding the decoded transparency difference output to transparency prediction signals and outputting the addition value to the storage means as the decoded transparency signals.

In accordance with the image decoding apparatus constructed above, coded transparency difference signals resulting from coding the transparency difference signals on the basis of the transparency coding parameter according to coding process for pixel value signals are decoded on the basis of the transparency coding parameter; therefore, it is possible to properly decode coded transparency difference signals with an amount of coded signals suppressed so as to avoid degradation of an image quality of a composite image obtained from pixel value signals and transparency signals. As a result, it is possible for decoding side to generate a composite image with no degradation of an image quality by regenerating pixel value signals and transparency signals at decoding side.

According to the present invention, the pixel value decoder includes a pixel value inverse quantizer for inversely quantizing the coded pixel value signals, and a pixel value inverse frequency converter for performing inverse frequency conversion to an output of the pixel value inverse quantizer; and the transparency decoder includes a transparency inverse quantizer for inversely quantizing the coded transparency signals, and a transparency inverse frequency converter for performing inverse frequency conversion to an output of the transparency inverse quantizer; and a value of a quantization step for use in inversely quantizing the coded transparency signals in the transparency inverse quantizer is controlled on the basis of a value of a quantization step for use in inversely quantizing coded pixel value signals in the pixel value inverse quantizer.

In accordance with the image decoding apparatus constructed above, when inversely quantizing coded transparency signals, a value of a quantization step used therefor is controlled on the basis of a value of a quantization step for use in inversely quantizing coded pixel value signals; thereby, it is possible to properly decode coded transparency signals even if a quantization step is controlled in coding process for transparency signals.

According to the present invention, the pixel value decoder includes a pixel value inverse quantizer for inversely quantizing the coded pixel value signals, and a pixel value inverse frequency converter for performing inverse frequency conversion to an output of the pixel value inverse quantizer; the difference decoder includes a transparency inverse quantizer for inversely quantizing the coded transparency difference signals, and a transparency inverse frequency converter for performing inverse frequency conversion to an output of the transparency inverse quantizer; and, a value of a quantization step for use in inversely quantizing the coded transparency difference signals in the transparency inverse quantizer is controlled on the basis of a value of a quantization step for use in inversely quantizing coded pixel value signals in the pixel value inverse quantizer.

In accordance with the image decoding apparatus constructed above, when inversely quantizing coded transparency difference signals, a value of a quantization step used therefor is controlled on the basis of a value of a quantization step for use in inversely quantizing coded pixel value signals; therefore, it is possible to properly decode coded transparency difference signals even if a quantization step is controlled in difference coding process for transparency signals.

According to the present invention, the pixel value decoder includes a pixel value inverse quantizer for inversely quantizing the coded pixel value signals, and a pixel value inverse frequency converter for performing inverse frequency conversion to an output of the pixel value inverse quantizer; the transparency decoder includes a transparency inverse quantizer for inversely quantizing plural frequency components obtained by performing frequency conversion to transparency signals and included in the coded transparency signals, and a transparency inverse frequency converter for performing inverse frequency conversion to an inversely quantized output corresponding to each frequency component from the transparency inverse quantizer; and, a value of a quantization step for use in inversely quantizing each frequency component in the transparency inverse quantizer is controlled for each frequency component on the basis of control information for controlling inverse quantization process for coded pixel value signals in the pixel value inverse quantizer.

In accordance with the image decoding apparatus constructed above, when performing inverse quantization to each of plural frequency components obtained by performing frequency conversion to transparency signals and included in coded transparency signals, a value of a quantization step for use in the inverse quantization is controlled for each transparency frequency component on the basis of control information for controlling inverse quantization process for pixel value frequency components; therefore, it is possible to properly decode coded transparency signals even if transparency signals are coded using a quantization step controlled for each frequency component.

According to the present invention, the pixel value decoder includes a pixel value inverse quantizer for inversely quantizing the coded pixel value signals, and a pixel value inverse frequency converter for performing inverse frequency conversion to an output of the pixel value inverse quantizer; the difference decoder includes a transparency inverse quantizer for inversely quantizing each of plural frequency components obtained by performing frequency conversion to transparency difference signals and included in the coded transparency difference signals, and a transparency inverse frequency converter for performing inverse frequency conversion to an inversely quantized output corresponding to each frequency component from the transparency inverse quantizer; and, a value of a quantization step for use in inversely quantizing each frequency component in the transparency inverse quantizer is controlled for each frequency component on the basis of control information for controlling inverse quantization process for coded pixel value signals in the pixel value inverse quantizer.

In accordance with the image decoding apparatus constructed above, when performing inverse quantization to each of plural frequency components obtained by performing frequency conversion to transparency difference signals and included in coded transparency difference signals, a value of a quantization step for use in the inverse quantization process is controlled for each frequency component of the transparency difference signals on the basis of control information for controlling inverse quantization process for pixel value frequency components; therefore, it is possible to properly decode coded transparency difference signals even if transparency difference signals are coded using a quantization step controlled for each frequency component.

According to the present invention, there is provided a method of decoding images in which not only coded pixel value signals resulting from coding pixel value signals indicating a pixel value of an image but coded transparency signals resulting from coding transparency signals indicating a composite ratio of pixel value for compositing the image and another image are decoded, and the method comprises the steps of: generating a transparency coding parameter indicating control information on coding process for the coded transparency signals on the basis of a pixel value coding parameter indicating control information on coding process for the coded pixel value signals and transparency coding control signals indicating a relation between the pixel value coding parameter and the transparency coding parameter; decoding the coded pixel value signals in accordance with the pixel value coding parameter; and decoding the coded transparency signals in accordance with the transparency coding parameter.

In accordance with the image decoding method constructed above, coded transparency signals are decoded on the basis of a transparency coding parameter according to a coding process for pixel value signals, and thus it is possible to properly decode coded transparency signals with an amount of coded signals suppressed so as to avoid degradation of an image quality of a composite image obtained from pixel value signals and transparency signals. As a result, it is possible to generate a composite image with no degradation of an image quality thereof by decoding coded pixel value signals and coded transparency signals.

According to the present invention, there is provided an image coding apparatus which receives pixel value signals indicating a pixel value of an image and transparency signals indicating a composite ratio of pixel value for compositing the image and another image as input signals and performs coding to the pixel value signals and the transparency signals, and the image coding apparatus comprises: a pixel value encoder for coding the pixel value signals to output coded pixel value signals, and outputting a pixel value coding parameter indicating control information on coding process for the pixel value signals; and a transparency encoder for coding the transparency signals to output coded transparency signals and outputting a transparency coding parameter indicating control information on coding process for the transparency signals.

In accordance with the image coding apparatus constructed above, since pixel value signals and transparency signals are coded on the basis of separate coding parameters, respectively, efficient, appropriate coding process is performed to each signal with high efficiency.

According to the present invention, the image coding apparatus further comprises a coding controller for generating pixel value coding control signals for controlling coding process for the pixel value signals and transparency coding control signals for controlling coding process for the transparency signals, on the basis of the coded pixel value signals and the coded transparency signals, respectively, so as to control the pixel value encoder and the transparency encoder in accordance with the pixel value coding control signals and the transparency coding control signals, respectively.

In accordance with the image coding apparatus constructed above, coding process for pixel value signals and that for transparency signals are feedback-controlled based on coded pixel value signals and coded transparency signals, respectively, and this realizes an optimal coding process which considers an image quality obtained from pixel value signals and an image quality obtained from transparency signals.

According to the present invention, there is provided an image coding apparatus which receives pixel value signals indicating a pixel value of an image and transparency signals indicating a composite ratio of pixel value for compositing the image and another image as input signals and performs coding to the pixel value signals and the transparency signals, and this apparatus comprises: a pixel value encoder for coding the pixel value signals to output coded pixel value signals, and outputting a pixel value coding parameter indicating control information on coding process for the pixel value signals; a transparency encoder for coding the transparency signals to output coded transparency signals, and outputting a transparency coding parameter indicating control information on coding process for the transparency signals; and a parameter encoder for performing coding process to signals obtained on the basis of the pixel value coding parameter and the transparency coding parameter, to output coded parameter signals corresponding to the two coding parameters.

In accordance with the image coding apparatus above constructed, since the pixel value coding parameter and the transparency coding parameter are coded together and output as coded parameter signals, the number of bits for coding process can be reduced in contrast with a case in which the pixel value coding parameter and the transparency coding parameter are separately coded and output.

According to the present invention, there is provided an image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but a pixel value coding parameter indicating control information on coding process for the pixel value signals and a transparency coding parameter indicating control information on coding process for the transparency signals, and performs decoding to the coded pixel value signals and the coded transparency signals; this apparatus comprises a pixel value decoder for decoding the coded pixel value signals in accordance with the pixel value coding parameter to output decoded pixel value signals, and a transparency decoder for decoding the coded transparency signals in accordance with the transparency coding parameter to output decoded transparency signals.

In accordance with the image decoding apparatus constructed above, since coded pixel value signals and coded transparency signals are decoded on the basis of the separate coding parameters, it is possible to properly decode coded pixel value signals and coded transparency signals which have been coded on the basis of separate coding parameters.

According to the present invention, there is provided an image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but coded parameter signals resulting from coding signals obtained from two types of parameters, that is, a pixel value coding parameter indicating control information on coding process for the pixel value signals and a transparency coding parameter indicating control information on coding process for the transparency signals, and performs decoding to the coded pixel value signals and the coded transparency signals; this apparatus comprises a parameter decoder for decoding the coded parameter signals to regenerate the pixel value coding parameter and the transparency coding parameter, a pixel value decoder for decoding the coded pixel value signals in accordance with the pixel value coding parameter to output decoded pixel value signals, and a transparency decoder for decoding the coded transparency signals in accordance with the transparency coding parameter to output decoded transparency signals.

In accordance with the image decoding apparatus constructed above, since the decoder is provided which performs decoding to coded parameter signals obtained by coding the pixel value coding parameter and the transparency coding parameter together so that each of the parameters can be regenerated, it is possible to properly decode coded pixel value signals and coded transparency signals on the basis of the coded parameter signals.

According to the present invention, there is provided a quantization control method in which, a pixel value quantization step for use in quantization process for pixel value signals indicating a pixel value of an image and a transparency quantization step for use in quantization process for transparency signals indicating a composition ratio of pixel value for compositing the image and another image are controlled, and during the control, quantization process is performed to the pixel value signals and the transparency signals, and this method comprises the steps of: initializing a pixel value quantization parameter which decides the pixel value quantization step and a transparency quantization parameter which decides the transparency quantization step for each first processing unit in the quantization process; and updating the pixel value quantization parameter and the transparency quantization parameter for each second processing unit which is different from the first processing unit in the quantization.

In accordance with the quantization control method constructed above, separate values are set as initial values of the quantization parameters which decide the quantization steps of pixel value signals and transparency signals, respectively, for each first processing unit, and a quantization control parameter indicating variation of the quantization parameter (control value) is decided for each second processing unit which is different from the first processing unit, and the quantization control parameter is utilized to update both of the quantization parameters; therefore, an amount of information of quantized pixel value signals and quantized transparency signals can be feedback-controlled, thereby performing a quantization process for pixel value signals and transparency signals corresponding to these signals. As a result, for example, an amount of quantized transparency signals to be coded can be reduced with no degradation of an image quality of a composite image represented by composite signals consisting of pixel value signals and transparency signals.

According to the present invention, there is provided an inverse quantization control method in which, a pixel value quantization step for use in an inverse quantization process for quantized pixel value signals resulting from quantizing pixel value signals indicating a pixel value of an image and a transparency quantization step for use in an inverse quantization process for quantized transparency signals resulting from quantizing transparency signals indicating a composite ratio of pixel value for compositing the image and another image are controlled, and under the control, inverse quantization process is performed to the quantized pixel value signals and the quantized transparency signals, and this method comprises the steps of: initializing a pixel value quantization parameter which decides the pixel value quantization step and a transparency quantization parameter which decides the transparency quantization step for each first processing unit in the inverse quantization; and updating the pixel value quantization parameter and the transparency quantization parameter for each second processing unit which is different from the first processing unit in the inverse quantization process.

In accordance with the inverse quantization control method above constructed, separate values are received as initial values of the quantization parameters which respectively decide the quantization step of quantized pixel value signals and that of quantized transparency signals, for each first processing unit, and a quantization control parameter indicating variation (control value) of the quantization parameter is received for each second processing unit which is different from the first processing unit, and the quantization control parameter is used to update both of the quantization parameters; therefore, quantized signals resulting from quantizing pixel value signals and transparency signals in accordance with the optimal quantization step are inversely quantized properly to generate pixel value signals and transparency signals, which allows to regenerate a composite image of a good image quality from composite signals consisting of pixel value signals and transparency and acquired from this inverse quantization process.

According to the present invention, a data recording medium is used for storing a signal processing program which makes a computer perform a coding process performed in the image coding apparatus of claim 1 or 15 or a decoding process performed in the image decoding apparatus of claim 8 or 18.

Use of such data recording medium allows to implement in a computer a coding process in which image signals including pixel value signals and transparency signals can be recorded and transmitted with fewer bits, with reduced redundant information of coded transparency signals and with no degradation of an image quality, or a decoding process in which the coded pixel value signals and coded transparency signals resulting from the coding process can be properly decoded.

According to the present invention, a data recording medium is used for storing a signal processing program which makes a computer perform a quantization process by the quantization control method or an inverse quantization process by the inverse quantization control method.

Use of such data recording medium allows to implement in a computer a quantization process in which an amount of information of quantized pixel value signals and that of quantized transparency signals can be feedback-controlled, or an inverse quantization process in which the pixel value signals and transparency signals subjected to the quantization process can be subjected to proper inverse quantization.

BEST MODE FOR CARRYING OUT THE INVENTION

Preferred embodiments of the present invention will now be described with reference to FIGS. 1 to 22.
Embodiment 1.

Figure 1:
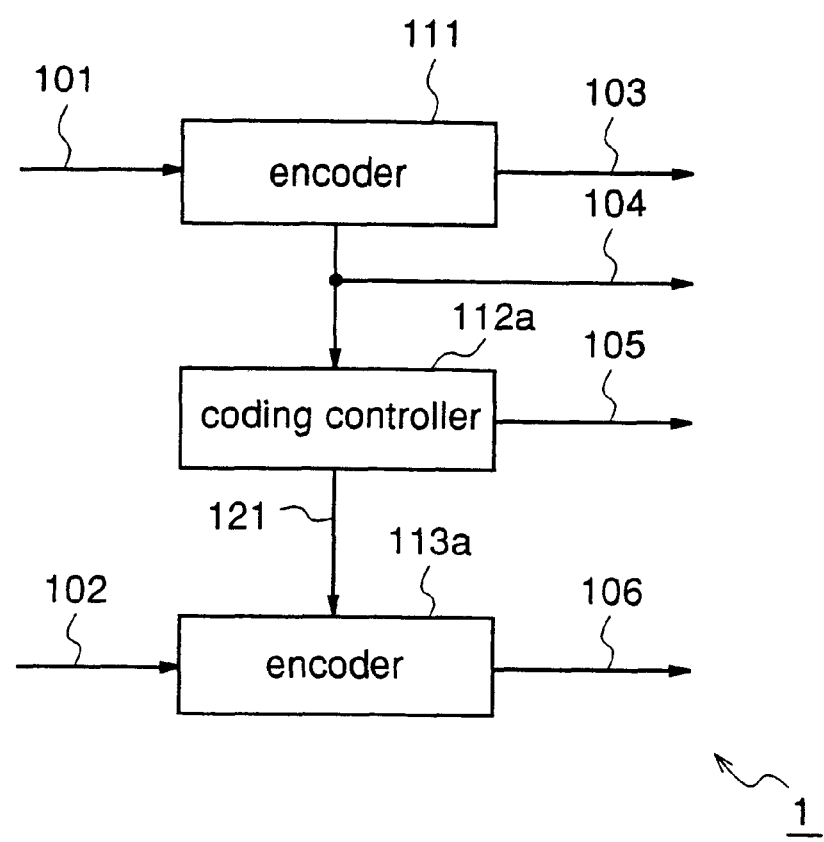
FIG. 1 is a block diagram showing a construction of an image coding apparatus according to a first embodiment of the present invention.

FIG. 1 is a block diagram for explaining an image coding apparatus 1 according to a first embodiment of the present invention.

The image coding apparatus 1 of the first embodiment is used for receiving pixel value signals 101 indicating an pixel value of an image and transparency signals 102 indicating a composite ratio of pixel value for compositing the image and another image as input signals, and performing coding process to these signals to output coded pixel value signals 103 and coded transparency signals 106.

More specifically, the image coding apparatus 1 comprises an encoder 111 for performing coding to the pixel value signals 101 corresponding to a prescribed image to output coded pixel value signals 103, and an encoder 113a for performing coding to the transparency signals 102 corresponding to the prescribed image to output coded transparency signals 106. The encoder 111 outputs a pixel value coding parameter 104 indicating control information for controlling coding process for pixel values, together with the coded pixel value signals 103.

The image coding apparatus 1 further comprises a coding controller 112a for generating, on the basis of the pixel value coding parameter 104, a transparency coding parameter 121 indicating control information for controlling coding process for the transparency signals, and the encoder 113a performs coding process to the transparency signals on the basis of the transparency coding parameter 121. The coding controller 112a outputs transparency coding control signals 105 indicating a relation between the pixel value coding parameter 104 and the transparency coding parameter 121, together with the transparency coding parameter 121.

Next, the operation will be described.

When the pixel value signals 101 and the transparency signals 102 each corresponding to a prescribed image are supplied to the image coding apparatus 1 of the first embodiment, coding process is performed to the pixel value signals 101 in the encoder 111, and from the encoder, the coded pixel value signals 103 and the pixel value coding parameter 104 used in the coding process are output.

In the coding controller 112a, the transparency coding parameter 121 indicating information for controlling coding process for the transparency signals is generated on the basis of the pixel value coding parameter 104, and output to the encoder 113a. The transparency coding control signals 105 indicating a relation between the pixel value coding parameter 104 and the transparency coding parameter 121 are also output from the coding controller 112a.

Then, in the encoder 113a, the transparency signals 102 are coded according to the transparency coding parameter 121 from the coding controller 112a and the transparency signals which are coded are output as coded transparency signal 106.

Figure 2:
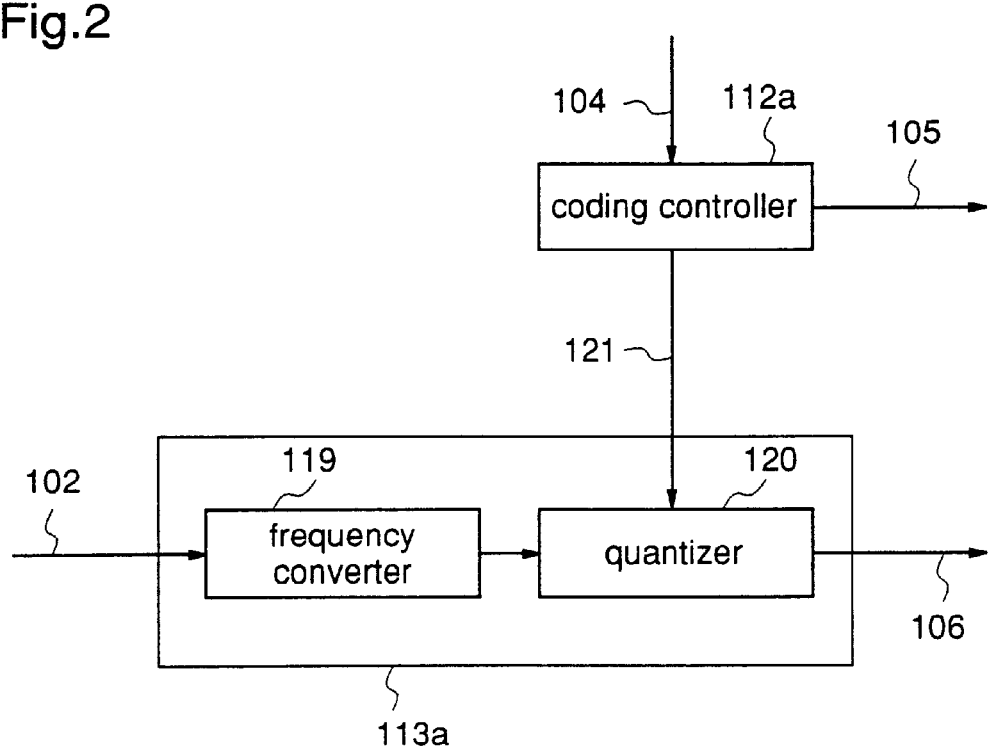
FIG. 2 is a block diagram showing a concrete construction of an encoder of the image coding apparatus according to the first embodiment.

Next, a concrete construction of an encoder of the image coding apparatus 1 is described with reference to FIG. 2.

The encoder 113a for coding the transparency signals comprises a frequency converter 119 for performing frequency conversion to the transparency signals 102 using discrete cosine transform (DCT) or the like and a quantizer 120 for quantizing an output of the frequency converter 119. As in the encoder 113a, the encoder 111 for coding the pixel value signals 101 comprises a frequency converter for performing frequency conversion to the pixel value signals 101 using discrete cosine transform (DCT) or the like and a quantizer for quantizing an output thereof, although these are not shown in the figure.

In this case, a value of a quantization step (hereinafter referred to as a pixel value quantization step) for use in quantizing the pixel value signals 101 that have been subjected to frequency conversion and a value of a quantization step (hereinafter referred to as a transparency quantization step) for use in quantizing the transparency signals 102 that have been subjected to frequency conversion are the pixel value coding parameter 104 and the transparency coding parameter 121, respectively. A scale factor of the transparency coding parameter 121 to the pixel value coding parameter 104 is a transparency coding control signals 105 and set by the coding controller 112a. That is, the transparency coding parameter 121 is a product of the pixel value coding parameter 104 and the transparency coding control signals 105.

In the coding controller 112a, a scale factor of the transparency quantization step to the pixel value quantization step is decided on the basis of the pixel value quantization step as the pixel value coding parameter 104 so that an image quality of the transparency signals 102 is appropriate to an image quality of the pixel value signals 101, and the decided scale factor is output as the transparency coding control signals 105.

Also in the coding controller 112a, the transparency quantization step is decided concurrently with the decision of the scale factor, and the decided transparency quantization step is supplied as the transparency coding parameter 121 to the quantizer 120 which is a constituent of the encoder 113a.

In the quantizer 120, the transparency signals 102 which have been subjected to frequency conversion in the frequency converter 119 are quantized according to the transparency coding parameter 121, and from the encoder 113a, an output of the quantizer 120 is output as the coded transparency signals 106.

The image coding apparatus 1 of the first embodiment constructed above comprises the coding controller 112a for generating the transparency coding parameter 121 for controlling coding process for the transparency signals on the basis of the pixel value coding parameter 104 for controlling coding process for the pixel value signals so as to perform coding process to the transparency signals 102 on the basis of the transparency coding parameter 121; therefore, according to an image quality obtained from pixel value signals of the individual images of a composite image, it is possible to control an image quality obtained from transparency signals of each image, and consequently, redundant information of the coded transparency signals resulting from coding the transparency signals can be reduced without degrading an image quality of each image, whereby image signals can be recorded and transmitted with fewer bits and without degrading an image quality.

This embodiment provides an case where the scale factor of the transparency coding step which is appropriate to the pixel value coding step is decided and then the transparency quantization step is decided, and on the basis of the transparency quantization step, quantization of the transparency signals is controlled, but alternatively, the scale factor of the transparency quantization step to the pixel value coding step may be set for each frequency component resulting from performing frequency conversion such as discrete cosine transform (DCT) or the like to transparency signals.

Figure 9:
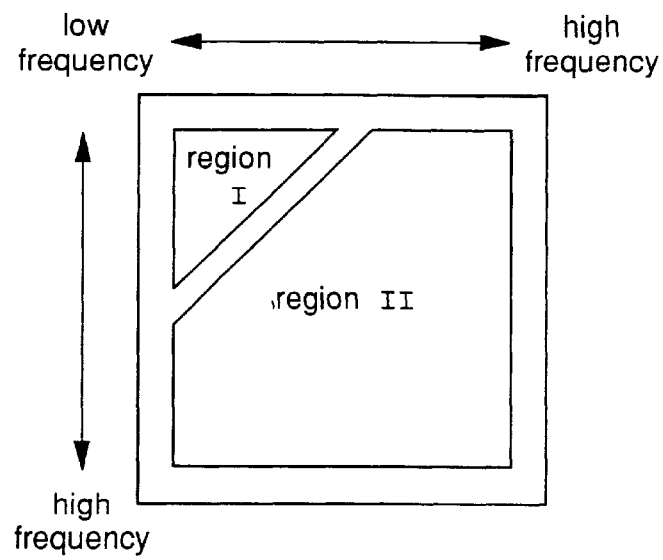
FIG. 9 is a schematic diagram for explaining control of quantization of image processing in the respective embodiments.

For example, FIG. 9 illustrates a characteristic of pixel value signals that have been subjected to frequency conversion (frequency coefficient), this characteristic showing that an average value of the frequency coefficient of a region I corresponding to a low-frequency region is different from that of a region II corresponding to a high-frequency region.

In this case, scale factors of the transparency quantization step to the pixel value quantization step are varied from each other between frequency-converted transparency signals in the low frequency region and the high-frequency region, thereby it is possible to implement setting of a scale factor in accordance with each frequency component.

Embodiment 2.

Figure 3:
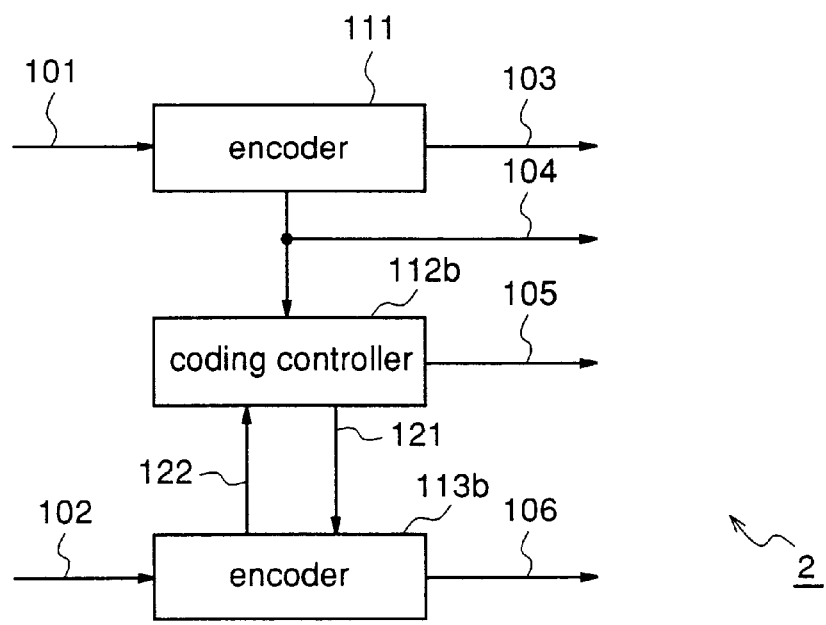
FIG. 3 is a block diagram showing a construction of an image coding apparatus according to a second embodiment of the present invention.

FIG. 3 is a block diagram for explaining an image coding apparatus according to a second embodiment of the present invention.

The image coding apparatus 2 of the second embodiment comprises an encoder 113b for performing coding process to the transparency signals 102 and outputting transparency relevant information 122 on the transparency signals 102, as a replacement of the encoder 112a of the image coding apparatus 1 of the first embodiment, and a coding controller 112b for setting a scale factor of the transparency coding step to the pixel value coding step on the basis of both the pixel value coding parameter 104 and the transparency relevant information 122, as a replacement of the coding controller 112a of the first embodiment. The other construction is identical to that of the image coding apparatus 1 of the first embodiment.

Next, the operation and effects will be described.

In the image coding apparatus 2 constructed above, the coding controller 112b controls the encoder 113b on the basis on the information 122 on the transparency signals 102 to be coded by the encoder 113b as well as the pixel value coding parameter 104. As a consequence, it is possible to control coding process adaptively in accordance with a content of the transparency signals 102 to be coded, that is, to control the encoder 113b so that code length is made smaller in accordance with the content, and significantly reduce an amount of coded transparency signals 106.

To say more specific, when the pixel value signals 101 and the transparency signals 102 each corresponding to a prescribed image are input to the image coding apparatus 2, in the encoder 111, a coding process including frequency conversion process and quantization process is performed to the pixel value signals 101, and the pixel value signals 101 which are coded are output as coded pixel value signals 103. At this time, from the encoder 111, a value of the quantization step used in quantizing frequency-converted pixel value signals is output to the coding controller 112b as the pixel value coding parameter 104.

Meanwhile, in the encoder 113b, a coding process including frequency conversion process and quantization process is performed to transparency signals 102 on the basis of the transparency coding parameter 121, and the transparency signals 102 coded are output as coded transparency signals 106. At this time, the encoder 113b outputs to the coding controller 112b plural frequency components resulting from frequency conversion of the transparency signals 102, as relevant information 122 on the transparency signals 102.

Also in the coding controller 112b, since an image quality of a pixel value signal is decided on the basis of the pixel value coding parameter 104 and a quality of a transparency signal 102 is decided on the basis of the transparency relevant information 122, a quantization step of each of the plural frequency components resulting from frequency conversion to the transparency signals 102 is decided in accordance with an image quality of pixel value signals and a quality of the transparency signals 102, and output to the encoder 113b as the transparency coding parameter 121.

Then, in the encoder 113b, coding is performed to the transparency signals 102 on the basis of the transparency coding parameter 121 decided in the above-described method.

As described above, in accordance with the second embodiment, since coding process is performed to transparency signals on the basis of the transparency relevant information 122 as well as the pixel value coding parameter 104, it is possible to perform coding to the transparency signals 102 with considerably high efficiency and significantly reduce an amount of coded transparency signals 106.

Embodiment 3.

Figure 4:
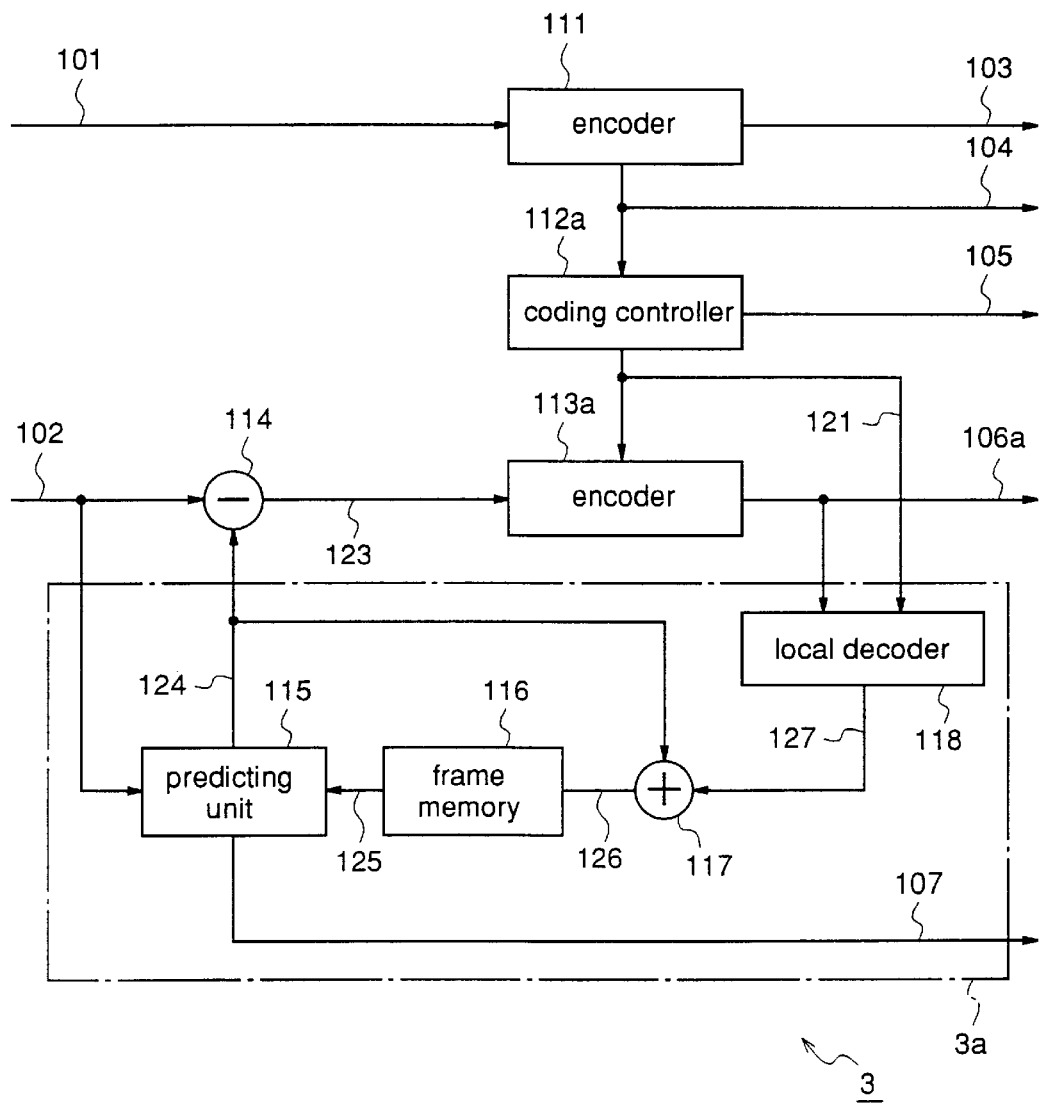
FIG. 4 is a block diagram showing a construction of an image coding apparatus according to a third embodiment of the present invention.

FIG. 4 is a block diagram for explaining the construction of an image coding apparatus according to a third embodiment of the present invention.

The image coding apparatus 3 of the third embodiment differs from the image coding apparatus 1 of the first embodiment that performs coding to the transparency signals 102 itself in that coding is performed to a transparency difference signal 123 which is a difference between a transparency signal and a prediction signal thereof (hereinafter referred to as a difference signal), and this shows that this apparatus differs from the image coding apparatus 1 of the first embodiment.

More specifically, the image coding apparatus 3 comprises a predicting unit 3a for predicting the transparency signals 102 of each pixel to produce prediction signals 124, and a difference unit 114 for computing difference between input transparency signals 102 and prediction signals 124 and outputting it as difference signals 123, in addition to the construction of the image coding apparatus 1 of the first embodiment, and codes the difference signals 123 of each pixel by the encoder 113a.

The transparency predicting unit 3a includes a local decoder 118 for decoding an output 106a of the encoder 113a (coded difference signals) on the basis of the transparency signal coding parameter 121 to regenerate the difference signals 123, and an adder 117 for adding the prediction signals 124 to regenerated difference signals 127 as an output of the decoder 118 to regenerate the transparency signals 126. The transparency predicting unit 3a further includes a frame memory 116 for storing regenerated transparency signals 126, i.e., an output of the adder 117, and a predicting unit 115 for producing the prediction signals 124 from an output 125 of the frame memory 116 and the transparency signals 102.

In the image coding apparatus 3, prediction signals 124 from the transparency predicting unit 3a are input to the difference unit 114, and difference signals between the transparency signals 102 input from the external and the prediction signals 124 are input to the encoder 113a.

The construction of the image decoding apparatus 3 other than this matter is identical to that of the image coding apparatus 1 of the first embodiment.

Next, the operation and effects will be described.

In the image coding apparatus 3 of the third embodiment, a process of coding pixel value signals 101 and a process of coding transparency signals 102 based on the transparency coding parameter 121 are performed in the same manner as in the first embodiment, and thus in the following description, a stress is given on a coding process for the transparency difference signals 123.

When the pixel value signals 101 and the transparency signals 102 each corresponding to a prescribed image are fed to the image coding apparatus 3 of the present invention, in the encoder 111, coding process is performed to pixel value signals 101 in the same manner as in the first embodiment, and coded pixel value signals 103 and pixel value coding parameters 104 used for the coding process are output.

Then, in the coding controller 112a, the transparency coding parameter 121 indicating information for controlling coding process for the transparency signals 102 is generated on the basis of the pixel value coding parameter 104 and output to the encoder 113a. Simultaneously, in the coding controller 112a, transparency coding control signals 105 indicating a relation between the pixel value coding parameter 104 and the transparency coding parameter 121 are output.

Then, in the encoder 113a, coding process is performed to the difference signals 123 corresponding to the transparency signals 102, in accordance with the transparency coding parameter 121 from the coding controller 112a, and the difference signals coded are output as coded difference signals 106a.

In the transparency predicting unit 3a, upon receipt of the transparency signals 102, the prediction signals 124 for predicting the transparency signals 102 are generated in the prediction image generating unit 115, on the basis of the transparency signals 102 and regenerated transparency signals 125 stored in the frame memory 116, and the prediction signals 124 are output to the difference unit 114. Simultaneously, from the predicting unit 115, a prediction signal producing parameter 107 on producing prediction signals 124 are output from the predicting unit 115.

In the difference unit 114, difference between the transparency signals 102 and the transparency prediction signals 124 are computed and supplied to the encoder 113a as difference signals 123.

At this time, in the encoder 113a, coding process is performed to the difference signals 123 in accordance with the transparency coding parameter 121 transmitted from the coding controller 112a, and the difference signals 123 coded are output as coded difference signals 106a.

The coded difference signals 106a are decoded by the local decoder 118 of the transparency predicting unit 3a in accordance with the transparency coding parameter 121, resulting in regenerated difference signals 127 corresponding to the difference signals 123. Then, regenerated difference signals 127 are added to the prediction signals 124 in the adder 117 and stored in the frame memory 116 as regenerated transparency signals 126.

Although in the third embodiment described is the image coding apparatus 3 in which difference signals between transparency signals and prediction signals are coded, differential coding process may be performed to pixel value signals.

For example, by providing a pixel value predicting unit for predicting pixel value signals to produce pixel value prediction signals which has the same construction as the transparency predicting unit, and a difference unit for generating difference signals between the pixel value prediction signals and pixel value signals, differential coding process for pixel value signals is implemented following the same procedure as in the case of transparency signals.

Embodiment 4.

Figure 5:
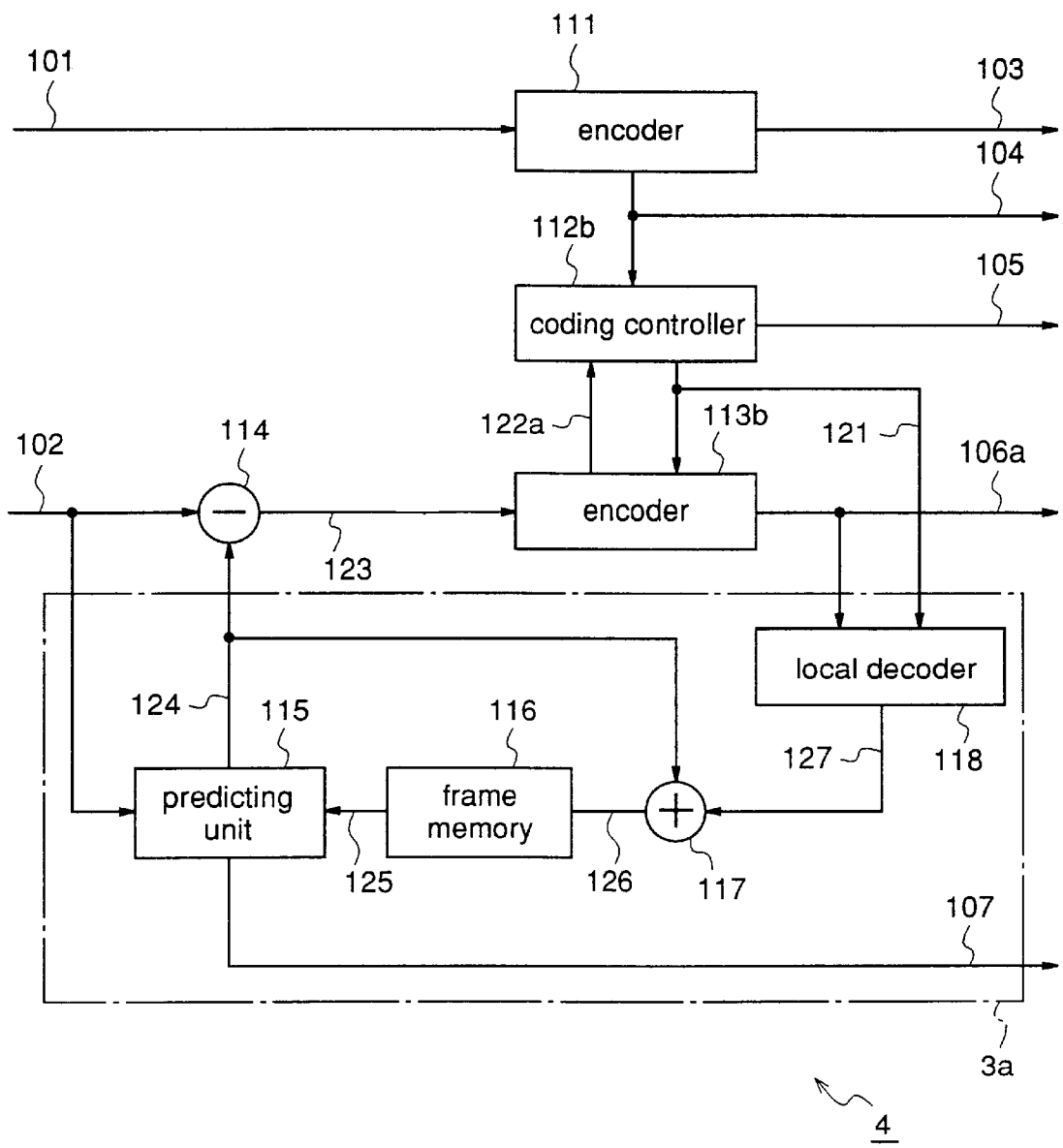
FIG. 5 is a block diagram showing a construction of an image coding apparatus according to a fourth embodiment of the present invention.

FIG. 5 is a block diagram for explaining an image coding apparatus according to a fourth embodiment of the present invention.

The image coding apparatus 4 of the fourth embodiment comprises an encoder 113b for performing coding process to difference signals 123 and outputting difference relevant information 122a on the difference signals 123, as a replacement of the encoder 113a of the image coding apparatus 3 of the third embodiment, and a coding controller 112b for setting a scale factor of the transparency coding parameter 121 to the pixel value coding parameter 104 based on both the pixel value coding parameter 104 and the difference relevant information 122a, as a replacement of the coding controller 112a of the image coding apparatus 1. Except for this, the construction is identical to that of the image coding apparatus 3 of the third embodiment.

Next, the operation and effects will be described.

In the image coding apparatus 4 constructed above, coding process for the difference signals 123 in the encoder 113b is controlled on the basis of the difference relevant information 122a regarding the difference signals 123 as well as the pixel value coding parameter 104. As a result, it is possible to control coding process adaptively in accordance with a content of the difference signals 123 to be coded, that is, to control the encoder 113b so that code length is made shorter in accordance with the content of the difference signal 123 to be coded, thereby significantly reducing amount of coded transparency signals 106a which are the difference signals 123 coded.

More specifically, when the pixel value signals 101 and the transparency signals 102 each corresponding to a prescribed image are input to this image coding apparatus 4, in the encoder 111, a coding process including frequency conversion process and quantization process is performed to the pixel value signals 101 and the pixel value signals 101 coded are output as coded pixel value signals 103. Simultaneously, from the encoder 111, a value of a quantization step used in quantizing pixel value signals that have been frequency converted is output to the coding controller 112b as the pixel value coding parameter 104.

Meanwhile, in the encoder 113b, coding process including frequency conversion process and quantization process is performed to difference signals 123 of transparency signals 102 on the basis of the transparency coding parameter 121, and the difference signals coded are output as coded difference signals 106a. Simultaneously, in the encoder 113b, plural frequency components resulting from frequency conversion to the difference signals 123 of the transparency signals 102 are output to the coding controller 112b as difference relevant information 122a on the difference signals 123.

Further in the coding controller 112b, since an image quality of pixel value signals is decided on the basis of the pixel value coding parameter 104 and a quality of the difference signals 102 is decided on the basis of the difference relevant information 122a, a quantization step corresponding to each of the plural frequency components obtained by frequency conversion of the difference signals 123 is decided in accordance with an image quality of pixel value signals and a quality of the difference signals 123, and output as the transparency coding parameter 121 to the encoder 113b.

Then, in the encoder 113b, coding is performed to difference signals 123 of the transparency signals 102 on the basis of the transparency coding parameter 121 which is decided above.

According to the fourth embodiment, as described above, coding process is performed to the difference signals 123 of transparency signals on the basis of the difference relevant information 122a as well as the pixel value coding parameter 104; therefore, it is possible to perform coding to the difference signals 123 of the transparency signals 102 with quite high efficiency, resulting in significantly reduced amount of coded transparency signals 106a.

Embodiment 5.

Figure 6:
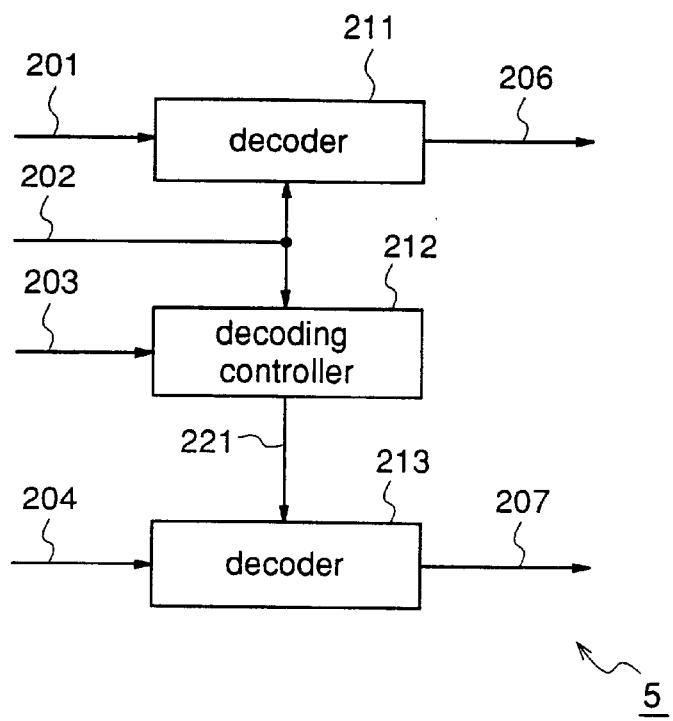
FIG. 6 is a block diagram showing a construction of an image decoding apparatus according to a fifth embodiment of the present invention.

FIG. 6 is a block diagram for explaining an image decoding apparatus according to a fifth embodiment of the present invention.

The image decoding apparatus 5 of the fifth embodiment is used for receiving coded pixel value signals 201 resulting from coding pixel value signals and coded transparency signals 204 resulting from coding transparency signals as input signals, performing decoding process to these coded signals to output regenerated pixel value signals 206 and regenerated transparency signals 207.

More specifically, the image decoding apparatus 5 includes a decoder 211 for decoding coded pixel value signals 201 corresponding to a prescribed image on the basis of the pixel value coding parameter 202 to output regenerated pixel value signals 206, and an encoder 213 for decoding the coded transparency signals 204 corresponding to the prescribed image to output regenerated transparency signals 207.

The image decoding apparatus 5 further includes a decoding controller 212 for generating a transparency coding parameter 221 on the basis of transparency coding control signals 203 indicating a relation between the pixel value coding parameter 202 and the transparency coding parameter 221 as well as the pixel value coding parameter 202, and the decoder 213 performs decoding process to the coded transparency signals 204 on the basis of the transparency coding parameter 221.

Next, the operation will be described.

When coded pixel value signals 201 and coded transparency signals 204 each corresponding to a prescribed image, and a pixel value coding parameter 202 and transparency coding control signals 203 are supplied to the image decoding apparatus 5 of the fifth embodiment, in the decoder 211, decoding process is performed to coded pixel value signals 201 in accordance with the pixel value coding parameter 202 and regenerated pixel value signals 206 are output.

At this time, in the decoding controller 212, transparency coding parameter 221 is generated on the basis of the transparency coding control signals 203 and the pixel value coding parameter 202, and then output to the decoder 213.

Then, in the decoder 213, decoding is performed to coded transparency signals 204 in accordance with the transparency coding parameter 221, and the coded transparency signals 204 which are decoded are output as regenerated transparency signals 207.

Figure 7:
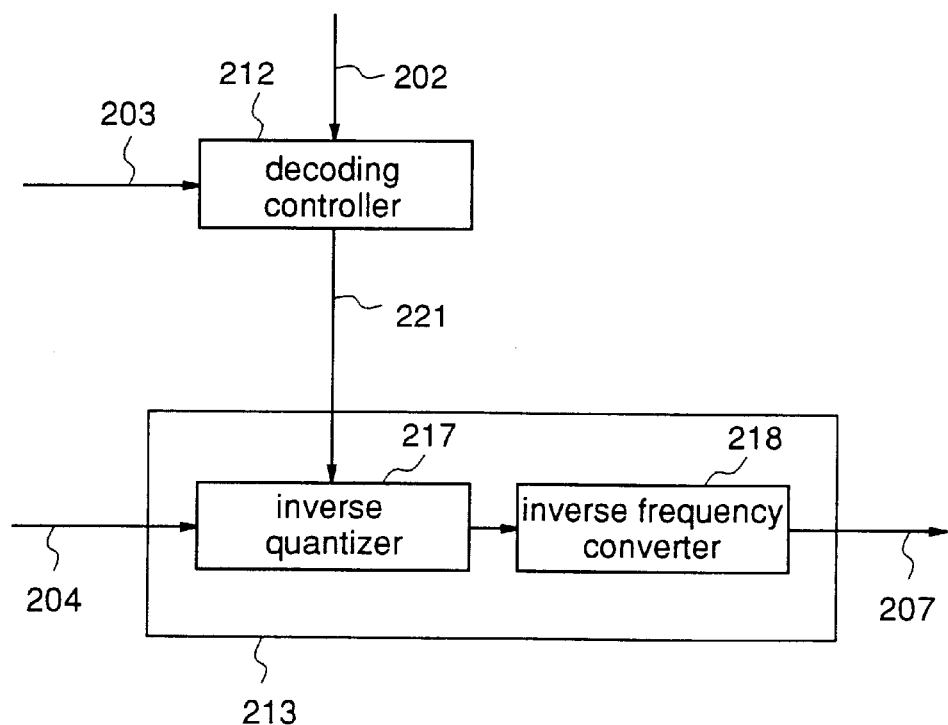
FIG. 7 is a block diagram showing a concrete construction of a decoder of the image decoding apparatus according to the fifth embodiment.

Next, a specific construction of the decoder 213 of the image decoding apparatus 5 is described with reference to FIG. 7.

The decoder 213 for decoding the coded transparency signals 204 includes an inverse quantizer 217 for inversely quantizing the coded transparency signals 204 and an inverse frequency converter 218 for performing inverse frequency conversion to an output of the inverse quantizer 217 by inverse discrete cosine transform (IDCT) or the like. The decoder 201 for decoding coded pixel value signals 201 includes an inverse quantizer for inversely quantizing coded pixel value signals and an inverse frequency converter for performing inverse frequency conversion to an output of the inverse quantizer by inverse discrete cosine transform (IDCT) as in the decoder 203, although this is not shown in the figure.

Here it is assumed that a value of quantization step for use in inversely quantizing the coded pixel value signals 201 in an inverse quantizer of the decoder 211 and a value of a quantization step for use in inversely quantizing the coded transparency signals 202 in the inverse quantizer 217 of the decoder 213 are the pixel value coding parameter 202 and the transparency coding parameter 221, respectively. It is further assumed that the transparency coding control signals 203 indicate a scale factor and therefore the transparency coding parameter 221 is represented as a product of the pixel value coding parameter 104 and the transparency coding control signals 203.

In the decoding controller 212, the value of the quantization step for use in inversely quantizing the coded pixel value signals 201 input as the pixel value coding parameter 202 is multiplied by the scale factor input as the transparency coding control signals 203, whereby the value of quantization step for use in inverse quantization of the coded transparency signals 204 is decided.

Also, in the decoding controller 212, the value of quantization step is decided concurrently with decision of the scale factor and the decided value of quantization step is supplied to the inverse quantizer 217 of the decoder 213 as the transparency coding parameter 221.

Then, in the inverse quantizer 217, the coded transparency signals 204 is inversely quantized according to the transparency coding parameter 221, and in the inverse frequency converter 218, inverse frequency conversion is performed to an output of the inverse quantizer 217 and output as regenerated transparency signals 207.

The image decoding apparatus 5 of the fifth embodiment constructed above comprises a decoding controller 212 for generating the transparency coding parameter 221 for controlling decoding process for coded transparency signals on the basis of the pixel value coding parameter 202 for controlling coding process for pixel value signals and the transparency coding control signals 203, and performs decoding process to the coded transparency signals 204 on the basis of the transparency coding parameter 221; therefore, it is possible to properly decode the coded transparency signals 204 resulting from coding the transparency signals of each image according to an image quality decided by pixel value signals of each image.

As a result, it is possible to generate a composite image without degrading an image quality of the individual images thereof by decoding the coded pixel value signals 201 and the coded transparency signals 204.

This embodiment presents a case where the value of quantization step for use in inversely quantizing the coded transparency signals 204 is decided by multiplying a scale factor input as the transparency coding control signals 203 by the pixel value coding parameter 202 (the value of quantization step for use in inversely quantizing the coded pixel value signals 201) to control inverse quantization of coded transparency signals 204; however, there is an alternative that the scale factor for use in inversely quantizing the coded transparency signals may be changed for each frequency component included in the coded transparency signals.

For example, setting the scale factor corresponding to each frequency component is implemented by setting the scale factor indicated by the transparency coding control signals 203 in inverse quantization process such that, among the plural frequency conversion coefficients quantized and included in the coded transparency signals, the scale factors of the coefficients corresponding to a low-frequency region differ from those of the coefficients corresponding to a high-frequency region.

Embodiment 6.

Figure 8:
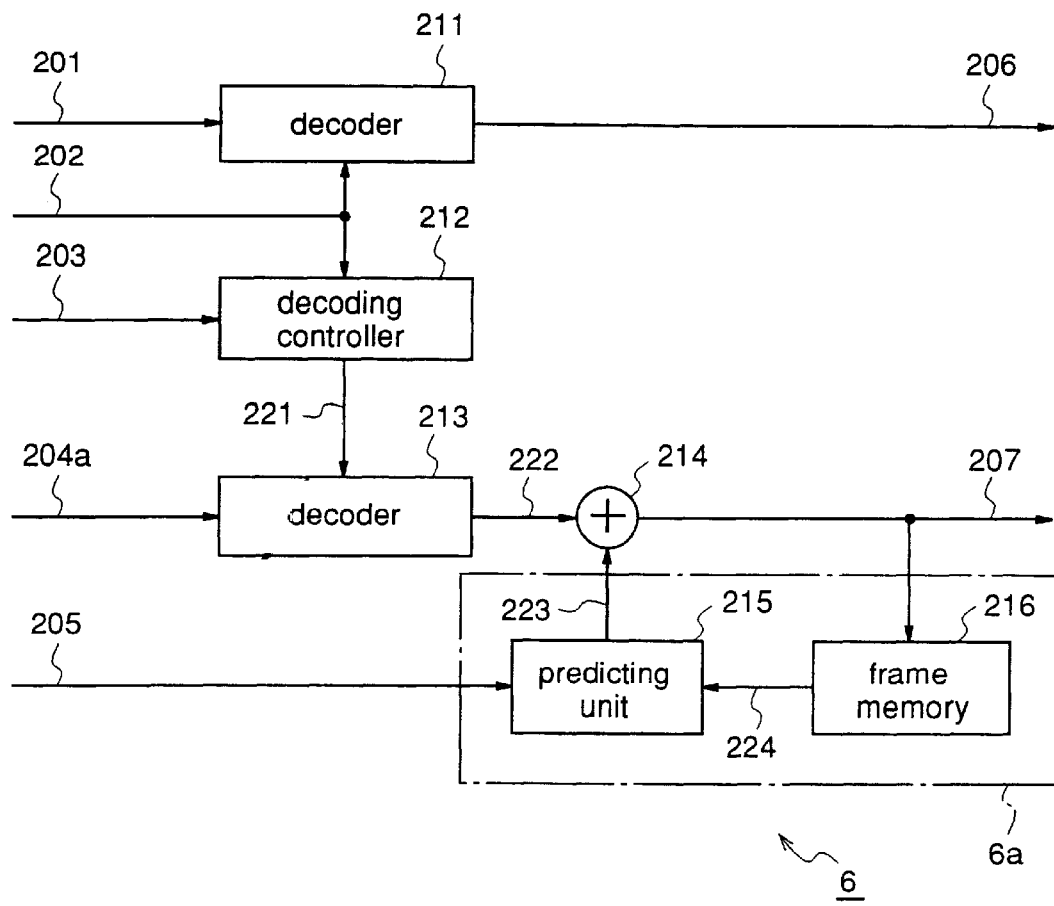
FIG. 8 is a block diagram showing a construction of an image decoding apparatus according to a sixth embodiment of the present invention.

FIG. 8 is a block diagram for explaining an image decoding apparatus according to a sixth embodiment of the present invention.

The image decoding apparatus 6 of the sixth embodiment differs from the image decoding apparatus 5 of the fifth embodiment in the following respect: in the image decoding apparatus 5, the coded transparency signals 204 resulting from coding transparency signals itself are decoded by the decoder 213, whereas, in the image decoding apparatus 6, coded difference signals 204a resulting from coding difference signals, i.e., difference between transparency signals and prediction signals thereof are decoded by the decoder 213.

The image decoding apparatus 6 includes, in addition to the construction of the image decoding apparatus 5 of the fifth embodiment, a transparency predicting unit 6a for predicting regenerated transparency signals 207 for each pixel to generate prediction signals 223 and an adder 214 for adding decoded transparency signals 222 output from the decoder 213 to prediction signals 223, the output of which adder 214 is output as regenerated transparency signals 207.

The transparency predicting unit 6a includes a frame memory 216 for storing regenerated transparency signals 207 as outputs of the adder 214, and a predicting unit 215 for producing the prediction signals 223 on the basis of the output 224 of the frame memory 216 and the prediction signal producing parameter 205 supplied from the external.

Except for this, the construction of the image decoding apparatus 6 is identical to that of the image decoding apparatus 5 of the fifth embodiment.

Next, the operation will be described.

In the image decoding apparatus 6 of the sixth embodiment, a process of decoding the coded pixel value signals 201 and that of decoding the coded transparency signals (coded difference signals) 204a on the basis of the transparency decoding parameter 221 are performed in the same manner as in the image decoding apparatus 5 of the fifth embodiment, and thus the description is given with a stress on a decoding process for coded difference signals 204a.

When coded pixel value signals 201 and coded difference signals 204 each corresponding to each image are supplied to the image decoding apparatus 6 of the sixth embodiment, in the decoder 211, decoding is performed to coded pixel value signals 201 as in the fifth embodiment and regenerated pixel value signals 206 are output.

At this time, in the decoding controller 212, transparency coding parameter 221 indicating the information for controlling decoding of coded difference signals is generated on the basis of the pixel value coding parameter 202 supplied from the external and the transparency coding control signals 203, and then output to the decoder 213.

Then, in the decoder 213, decoding process is performed to coded difference signals 204a in accordance with the transparency coding parameter 221 from the decoding controller 212 and the difference signals which are decoded are output as decoded difference signals 222.

At this time, in the predicting unit 215, regenerated transparency signals 207 to be decoded are predicted from the regenerated transparency signals 224 stored in the frame memory 216 on the basis of the prediction signal producing parameter 205 as the parameter on producing prediction signals, to produce prediction signals 223.

In the adder 214, the prediction signals 223 are added to the difference signals 222 and this addition value is output as regenerated transparency signals 207, and stored in the frame memory 216.

The image decoding apparatus 6 of the sixth embodiment has a capability of performing correct decoding to the coded pixel value signals 201 resulting from coding pixel value signals and the coded difference signals 204a resulting from coding difference signals between transparency signals and prediction signals thereof, whereby it is possible to generate a composite image with no degradation of an image quality of each image.

The sixth embodiment provides the image decoding apparatus 6 which performs decoding to coded difference signals resulting from coding of difference signals between transparency signals and prediction signals, but difference decoding process may be performed to coded pixel value signals as well.

For example, by providing a pixel value predicting unit of the same construction as the transparency predicting unit, for predicting regenerated pixel value signals to produce prediction signals and an adder for adding difference signals to prediction signals, difference decoding to pixel value signals can be implemented using the same procedure as in the case of transparency signals.

Embodiment 7.

Figure 10:
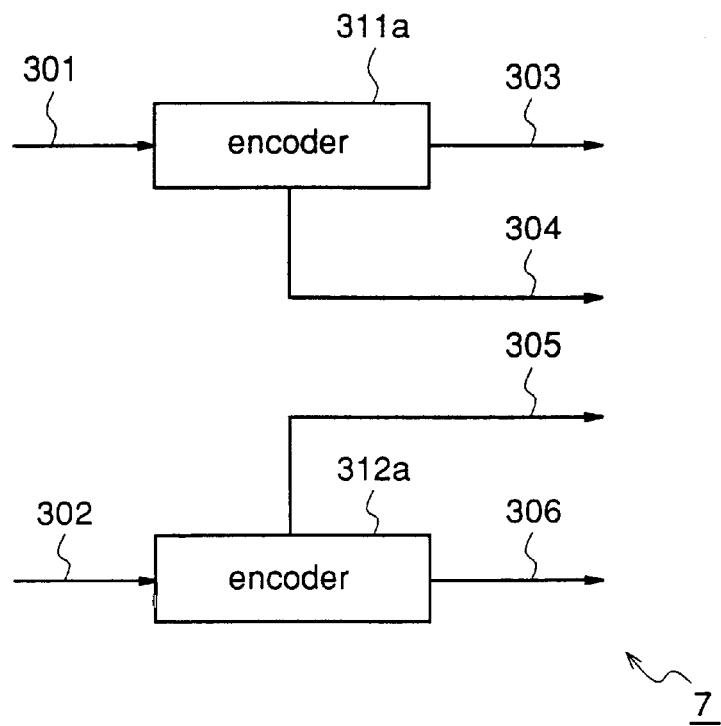
FIG. 10 is a block diagram showing a construction of an image coding apparatus according to a seventh embodiment of the present invention.

FIG. 10 is a block diagram for explaining an image coding apparatus according to a seventh embodiment of the present invention.

The image coding apparatus 7 of the seventh embodiment is used for receiving, as input signals, pixel value signals 301 indicating a pixel value of each image and transparency signals 302 indicating a composite ratio of pixel value for compositing the image with another image, respectively, and performing coding process to these signals to output coded pixel value signals 303 and coded transparency signals 306. The pixel value signals 301 and the transparency signals 302 are composited before image regeneration, and from the resulting composited signal, a single image is displayed.

More specifically, the image coding apparatus 7 comprises: an encoder 311a for coding pixel value signals 301 corresponding to a prescribed image to output coded pixel value signals 303, and outputting a pixel value coding parameter 304 indicating control information for controlling coding process for the pixel value signals 301; and an encoder 312a for coding transparency signals 302 corresponding to the prescribed image to output coded transparency signals 306 and outputting a transparency signal coding parameter 305 indicating control information for controlling coding process for the transparency signals 302.

Next, a description is given of the operation and effects.

When pixel value signals 301 and transparency signals 302 each corresponding to a prescribed image are supplied to the image coding apparatus 7 of the seventh embodiment, in the encoder 311a, the pixel value signals 301 are coded and the pixel value signals 301 which are coded are output as coded pixel value signals 303. At this time, from the encoder 311a, the control information for the coding process for pixel value signals 301 is output as a pixel value coding parameter 304.

Further in the encoder 312a, the transparency signals 302 are coded, and the transparency signals 302 which are coded are output as coded transparency signals 306. At this time, from the encoder 312a, the control information for the coding process for transparency signals 302 is output as a transparency coding parameter 305.

According to the seventh embodiment, since pixel value signals 301 and transparency signals 302 are coded based on their separate coding parameters, it is possible to perform efficient and appropriate coding process to each signal.

Embodiment 8.

Figure 11:
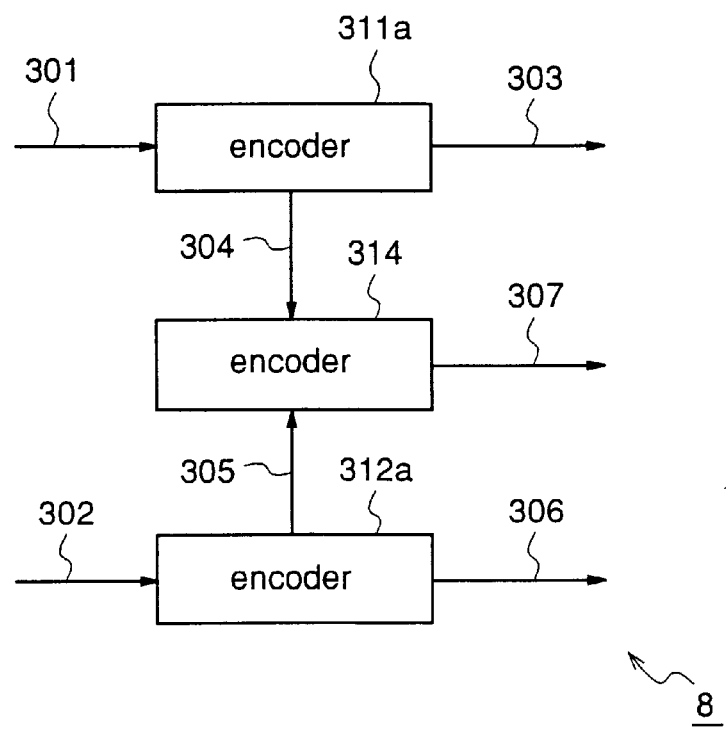
FIG. 11 is a block diagram showing a construction of an image coding apparatus according to an eighth embodiment of the present invention.

FIG. 11 is a block diagram for explaining an image coding apparatus according to an eighth embodiment of the present invention.

In addition to the construction of the image coding apparatus 7 of the seventh embodiment, the image coding apparatus 8 of the eighth embodiment comprises an encoder 314 for coding the pixel value coding parameter 304 and transparency coding parameter 305 together, and thus the construction of the apparatus other than this encoder is identical to that of the seventh embodiment.

Next, a description is given of the operation and effects.

When pixel value signals 301 and transparency signals 302 corresponding to a prescribed image are supplied to the image coding apparatus 8 of the eighth embodiment, in the encoder 311a, coding process for the pixel value signals 301 is performed, and a pixel value coding parameter 304 for controlling the coding process for the pixel value signals 301 is output with coded pixel value signals 303.

Further in the encoder 312a, coding process is performed to the transparency signals 302, and a transparency coding parameter 305 for controlling the coding process for the transparency signals 302 is output with coded transparency signals 306.

At this time, in the encoder 314, coding process for coding both the pixel value coding parameter 304 and transparency coding parameter 305 together is performed, and thereby the both parameters 304 and 305 are output as coded parameter signals 307.

For instance, in the coding process for parameters in the encoder 314, a difference signal indicating a difference between a pixel value coding parameter 304 and a transparency coding parameter 305 is subjected to variable-length coding, and then one of the two types of coding parameters is subjected to variable-length coding.

In accordance with the eighth embodiment, the coding processes for pixel value signals 301 and transparency signals 302 are performed, respectively, and simultaneously a pixel value coding parameter 304 and a transparency parameter 305 are coded together to output coded parameter signals 307; therefore, it is possible to further reduce a number of bits required in coding process as compared with the case as in the seventh embodiment in which a pixel value coding parameter 304 and a transparency coding parameter 305 themselves are output as the control information for coding process.

Embodiment 9.

Figure 12:
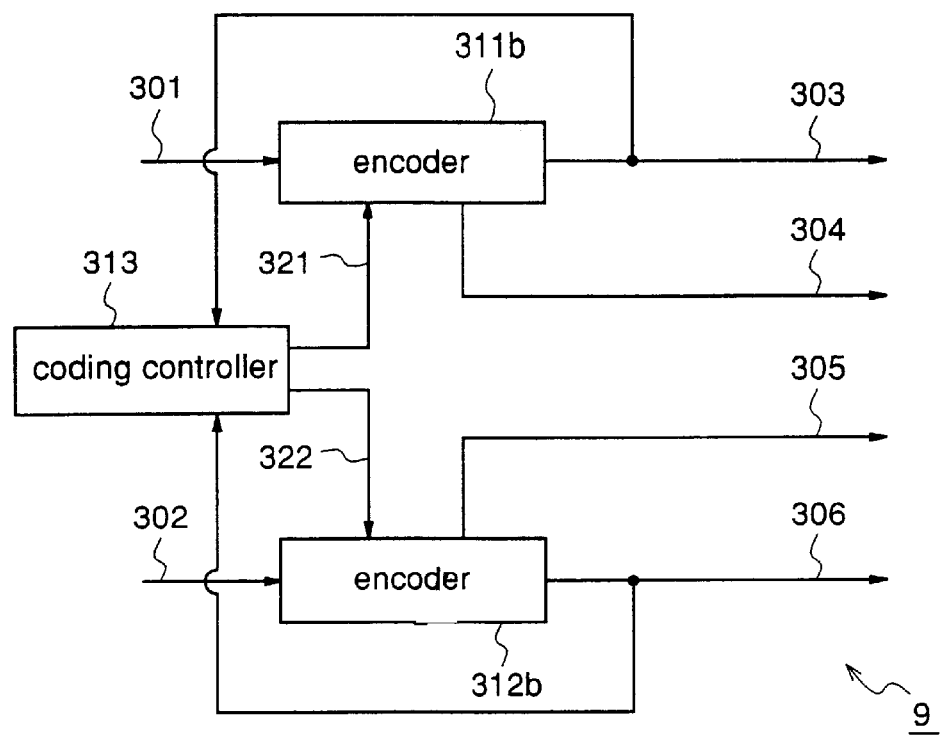
FIG. 12 is a block diagram showing a construction of an image coding apparatus according to a ninth embodiment of the present invention.

FIG. 12 is a block diagram for explaining an image coding apparatus according to a ninth embodiment of the present invention.

In addition to the construction of the image coding apparatus 7 of the seventh embodiment, the image coding apparatus 9 of the ninth embodiment comprises a coding controller 313 for controlling the coding process for pixel value signals 301 and that for transparency signals 302 by means of pixel value coding control signals 321 and transparency coding control signals 322, respectively.

More specifically, the image coding apparatus 9 comprises: an encoder 311b for coding pixel value signals 301 corresponding to a prescribed image based on pixel value coding control signals 321 and outputting a pixel value coding parameter 304 indicating control information for controlling the coding process for pixel values, with coded pixel value signals 303; and an encoder 312b for coding transparency signals 302 corresponding to the prescribed image based on transparency coding control signals 322 and outputting a transparency coding parameter 305 indicating control information for controlling the coding process for transparency signals, with coded transparency signals 306.

The image coding apparatus 9 further comprises a coding controller 313 for generating the respective control signals 321 and 322 on the basis of the coded pixel value signals 303 and the coded transparency signals 306.

Furthermore, the encoders 311b and 312b each comprise a frequency converter for subjecting input signals to frequency conversion process such as discrete cosine transformation (DCT) or the like, and a quantizer for quantizing the output of this frequency converter.

Next, a description is given of the operation and effects.

When pixel value signals 301 and transparency signals 302 corresponding to a prescribed image are supplied to the image coding apparatus 9 of the ninth embodiment, these signals are coded in the encoders 311b and 312b, respectively.

At this time, in the coding controller 313, pixel value coding control signals 321 and transparency coding control signals 322 are generated based on the output 303 of the encoder 311b and the output 306 of the encoder 312b, respectively, and then supplied to the encoders 311b and 312b, respectively.

In the encoder 311b, coding process is performed to pixel value signals 301 according to pixel value coding control signals 321, and the pixel value coding parameter 304 is output with the coded pixel value signals 303. Similarly in the encoder 312b, coding process for transparency signals is controlled by means of the transparency coding control signals 322 from the coding controller 313, and the transparency coding parameter 305 is output with the coded transparency signals 306.

According to the ninth embodiment, a coding controller 313 for generating control signals 321 and 322 based on coded pixel value signals 303 and coded transparency signals 306 is provided so as to control the respective encoders 311b and 312b by means of the corresponding control signals; therefore, even if a transmission rate required for transmitting each coded signal and a storage capacity required for storing coded signals are larger than a transmission rate of a transmission medium which is used and a storage capacity of a storage medium for storing coded signals (a prescribed number of bits), it is possible to control the coded amount for each type of coded signals by expanding quantization steps used for quantizing pixel value signals 301 and transparency signals 302.

Further, since the pixel value signals 301 and the transparency signals 302 are fed back to the coding controller 313, it is possible to control the quantization steps in view of a balance of image quality between the pixel value signals 301 and the transparency signals 302. As a result, redundant information of coded transparency signals can be reduced effectively without degrading the image quality of the resultant composite image, thereby considerably reducing the amount of the coded transparency signals 306 in comparison with that of the eighth embodiment.

Embodiment 10.

Figure 13:
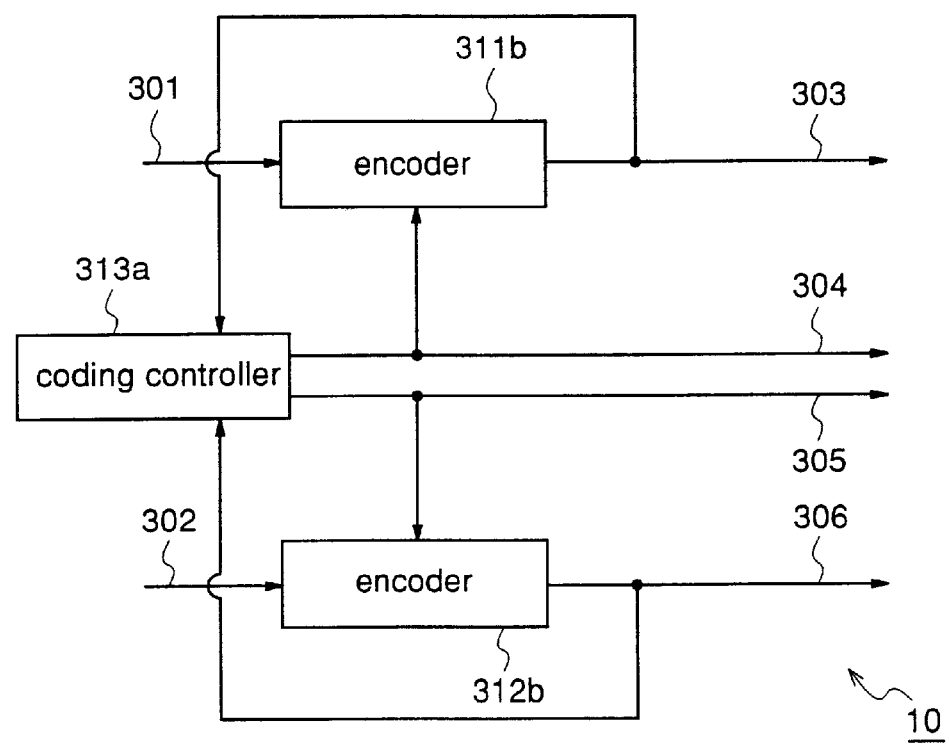
FIG. 13 is a block diagram showing a construction of an image coding apparatus according to a tenth embodiment of the present invention.

FIG. 13 is a block diagram for explaining an image coding apparatus of a tenth embodiment of the present invention.

The image coding apparatus 10 of the tenth embodiment comprises, in place of the coding controller 313 of the image coding apparatus 9 of the ninth embodiment, a coding controller 313a for generating a pixel value coding parameter 304 and a transparency coding parameter 305 as control signals for controlling pixel value coding process and transparency coding process, in order to perform coding processes in the respective encoders 311b and 312b according to the respective parameters 304 and 305.

In the image coding apparatus 10 thus constructed, the coding processes performed by the encoders 311b and 312b are controlled by means of the coding parameters 304 and 305 output from the coding controller 313, respectively, and these coding parameters are output to the decoding side, too; therefore, it is not necessary to generate coding parameters in the respective encoders 311b and 312b as in the image coding apparatus of the ninth embodiment, resulting in simplified construction of the encoders.

On the other hand, in the case of generating only one of the coding parameters in the coding controller, it is the generated coding parameter only which is output directly from the coding controller as shown in FIG. 12, the coding parameter not generated by the coding controller is generated in either of the encoders 311b and 312b, according to the coding control signals output from the coding controller, to be output.

Embodiment 11.

Figure 14:
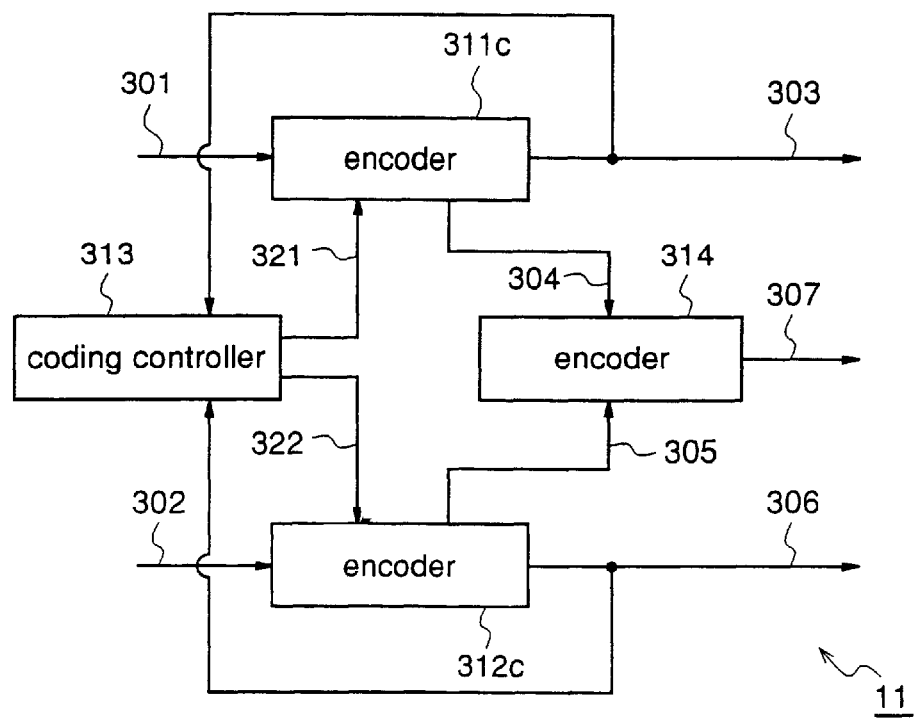
FIG. 14 is a block diagram showing a construction of an image coding apparatus according to an eleventh embodiment of the present invention.

FIG. 14 is a block diagram illustrating an image coding apparatus according to an eleventh embodiment of the present invention.

In addition to the construction of the image coding apparatus 8 of the eighth embodiment, the image coding apparatus 11 of the eleventh embodiment comprises a coding controller 313 for controlling the coding process for pixel value signals 301 and that for transparency signals 302 by means of pixel value coding control signals 321 and transparency coding control signals 322.

More specifically, the image coding apparatus 11 comprises: an encoder 311c for coding pixel value signals 301 corresponding to a prescribed image based on pixel value coding control signals 321, and outputting a pixel value coding parameter 304 indicating control information for controlling coding process for pixel value signals, with coded pixel value signals 303; and an encoder 312c for coding transparency signals 302 corresponding to the prescribed image based on transparency coding control signals 322 and outputting a transparency coding parameter 305 indicating control information for controlling coding process for transparency signals, with coded transparency signals 306.

The image coding apparatus 9 further comprises an encoder 314 for coding the pixel value coding parameter 304 and the transparency coding parameter 305 together, and a coding controller 313 for generating the respective control signals 321 and 322 based on the coded pixel value signals 303 and the coded transparency signals 306.

Furthermore, the encoders 311c and 312c each comprise a frequency converter for subjecting input signals to frequency conversion such as discrete cosine transformation (DCT) or the like, and a quantizer for quantizing the output of the frequency converter.

Next, a description is given of the operations and effects.

When pixel value signals 301 and transparency signals 306 corresponding to each image are supplied to the image coding apparatus 11 of the eleventh embodiment, coding processes are performed to these signals in the respective encoders 311c and 312c.

At this time, in the coding controller 313, pixel value coding control signals 321 and transparency coding control signals 322 are generated according to the output 303 of the encoder 311c and the output 306 of the encoder 312c, and then supplied to the encoders 311c and 312c, respectively.

In the encoder 311c, coding process is performed to the pixel value signals 301 according to the pixel value coding control signals 321, and from the encoder 311c, a pixel value coding parameter 304 is output together with the coded pixel value signals 303. Similarly in the encoder 312c, the coding process for the transparency signals is controlled by means of the transparency coding control signals 322 from the coding controller 313, and from the encoder 312c, a transparency coding parameter 305 is output with the coded transparency signals 306.

In this eleventh embodiment, coding processes are performed to the pixel value signals 301 and the transparency signals 302, respectively, and simultaneously, a pixel value coding parameter 304 and a transparency coding parameter 305 are coded together by the encoder 314 to output the same as coded parameter signals 307; therefore, it is possible to further reduce a number of bits required in the coding process in comparison with the case of the seventh embodiment where a pixel value coding parameter 304 and a transparency coding parameter 305 themselves are output as the control information on coding process.

Furthermore, since the pixel value signals 301 and the transparency signals 302 are fed back to the coding controller 313, it is possible to control the quantization steps in view of a balance of image quality between the pixel value signals 301 and the transparency signals 302. Therefore, redundant information of the coded transparency signals can be reduced effectively without degrading the image quality of a composited image, thereby further reducing the amount of the coded transparency signals 306 extensively in comparison with the eighth embodiment.

Embodiment 12.

Figure 15:
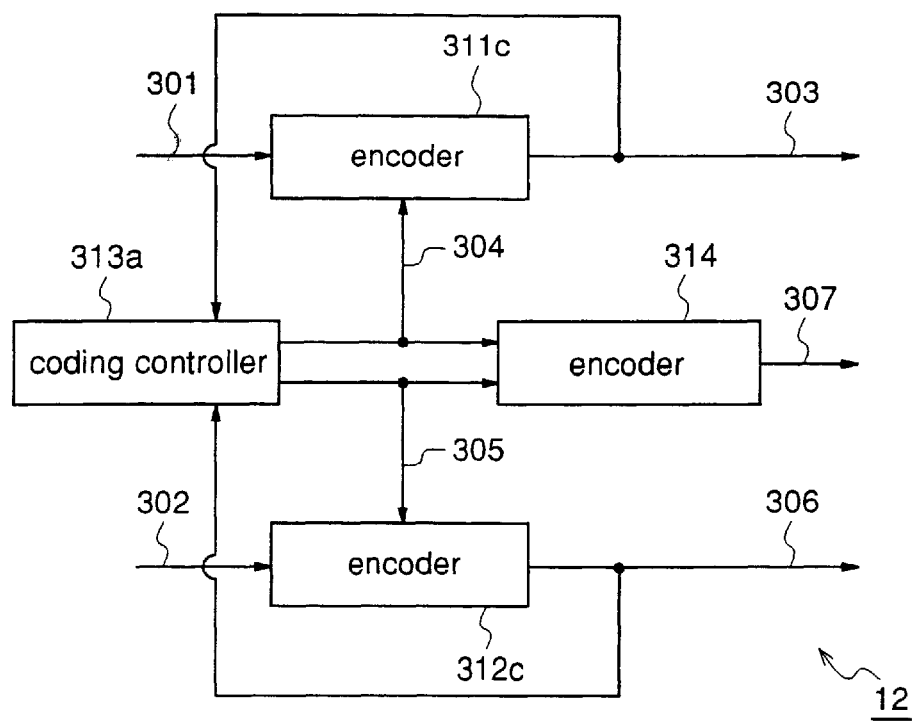
FIG. 15 is a block diagram showing a construction of an image coding apparatus according to a twelfth embodiment of the present invention.

FIG. 15 is a block diagram for explaining an image coding apparatus according to a twelfth embodiment of the present invention.

The image coding apparatus 12 of the twelfth embodiment comprises, in place of the coding controller 313 of the image coding apparatus 11 of the eleventh embodiment, a coding controller 313a for generating a pixel value coding parameter 304 and a transparency coding parameter 305 as control signals for controlling pixel value coding process and transparency coding process, and the respective encoders 311c and 312c perform coding processes based on these parameters, respectively, and that the encoder 314 codes the respective parameters 304 and 305 together to output coded parameter signals 307.

In the image coding apparatus 12 thus constructed, the coding processes performed by the encoders 311 and 312c are controlled by the coding parameters 304 and 305 output from the coding controller 313a, respectively, and the both coding parameters are coded together by the encoder 314 and output to the decoding side; therefore, it is not required to generate coding parameters in the respective encoders 311c and 312c as in the case of the image coding apparatus 11 of the eleventh embodiment, resulting in simplified structure of the encoders.

Further, in the case of generating only one of the code parameters in the coding controller, it is a generated coding parameter only which is output directly from the coding controller to the encoder 314 as shown in FIG. 14, and a coding parameter which is not generated by the coding controller is generated by one of the encoders 311b and 312b in response to a coding control signal output from the coding controller.

Embodiment 13.

Figure 16:
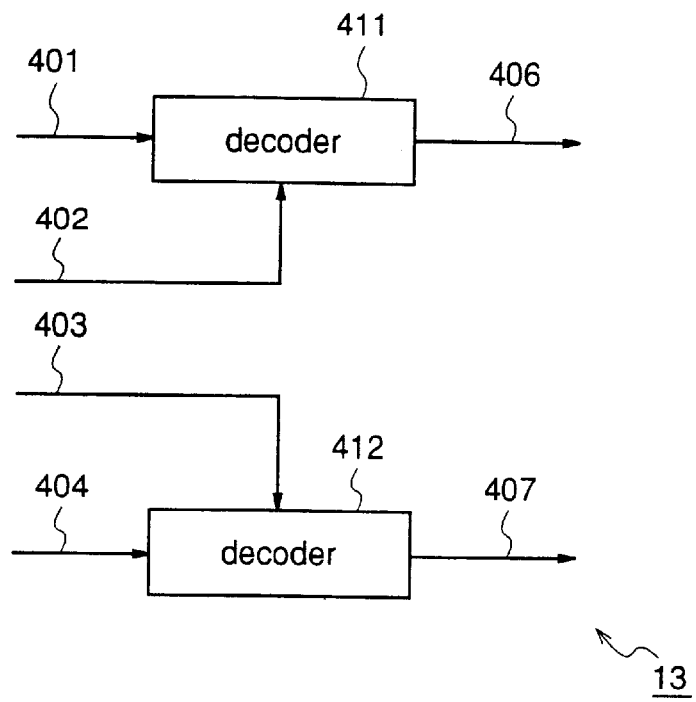
FIG. 16 is a block diagram showing a construction of an image decoding apparatus according to a thirteenth embodiment of the present invention.

FIG. 16 is a block diagram for explaining an image decoding apparatus according to a thirteenth embodiment of the present invention.

The image decoding apparatus 13 of the thirteenth embodiment is used for receiving coded pixel value signals 401 resulting from coding pixel value signals and coded transparency signals 404 resulting from coding transparency signals, as inputs, and performing decoding processes to these coded signals, respectively, to output regenerated pixel value signals 406 and regenerated transparency signals 407.

More specifically, the image decoding apparatus 13 comprises: a decoder 411 for decoding coded pixel value signals 401 corresponding to a prescribed image, based on a pixel value coding parameter 402 which is supplied from the external, to output regenerated pixel value signals 406; and an encoder 412 for decoding coded transparency signals 404 corresponding to the prescribed image to output regenerated transparency signals 407.

Next, the operation and effects will be described.

When coded pixel value signals 401 and coded transparency signals 404 corresponding to a prescribed image are supplied with a pixel value coding parameter 402 and a transparency coding parameter 403 to the image decoding apparatus 13 of the thirteenth embodiment, in the decoder 411, decoding process is performed to the coded pixel value signals 401 based on the pixel value coding parameter 402 indicating control information for the coding process for the coded pixel value signals 401, and from the decoder 411, the coded pixel value signals 401 decoded are output as regenerated pixel value signals 406.

In the decoder 412, decoding process is performed to the coded transparency signals 404 based on the transparency coding parameter 403 indicating control information for the coding process for coded transparency signals 404, and from the decoder 412, the coded transparency signals 404 decoded are output as regenerated transparency signals 407.

In the image decoding apparatus 13 of the thirteenth embodiment which is thus constructed, the coded pixel value signals 401 and coded transparency signals 404 which result from coding pixel value signals and transparency signals 404 based on separate coding parameters, are decoded according to the respective coding parameters 402 and 403; therefore, it is possible to correctly decode coded pixel value signals and coded transparency signals both resulting from the coding processes based on separate coding parameters.

Embodiment 14.

Figure 17:
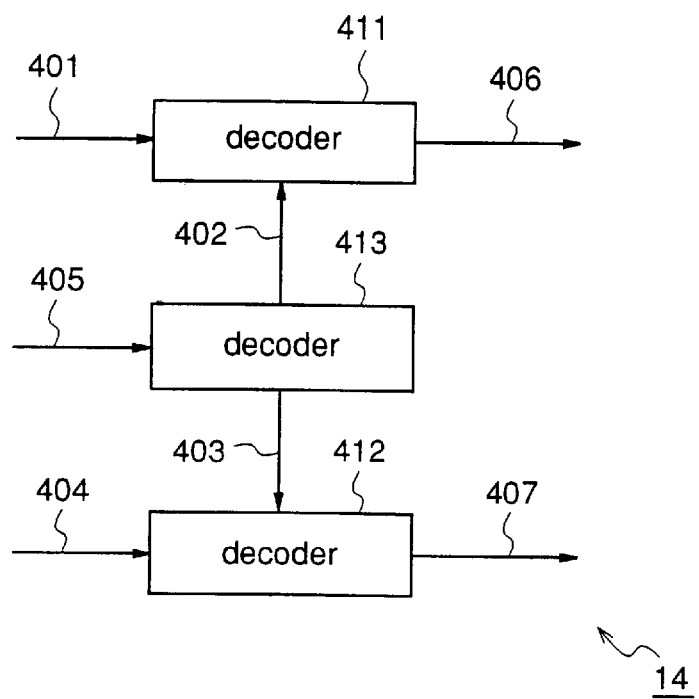
FIG. 17 is a block diagram showing a construction of an image decoding apparatus according to a fourteenth embodiment of the present invention.

FIG. 17 is a block diagram for explaining an image decoding apparatus according to a fourteenth embodiment of the present invention.

In addition to the construction of the image decoding apparatus 13 of the thirteenth embodiment, the image decoding apparatus 14 of the fourteenth embodiment comprises a decoder 413 for decoding coded parameter signals 405 resulting from coding a pixel value coding parameter 402 and a transparency coding parameter 403 together, so as to supply the coding parameters 402 and 403 which are decoded to the decoders 411 and 412, respectively.

Next, the operation and effects will be described.

When coded pixel value signals 401 and coded transparency signals 404 corresponding to each image are supplied with a coded parameter 405 to the image decoding apparatus 14 of the fourteenth embodiment, decoding process is performed to the coded parameter 405 in the decoder 413 to output a pixel value coding parameter 402 and a transparency parameter 403.

Further, in the decoder 411, decoding process is performed to the coded pixel value signals 401 based on the pixel value coding parameter 402, and the coded pixel value signals 401 decoded are output as regenerated pixel value signals 406.

Further, in the decoder 412, decoding process is performed to the coded transparency signals 404 based on the transparency coding parameter 403, and the coded transparency signals 404 which are decoded are output as regenerated transparency signals 407.

This enables correct decoding of pixel value signals 401 and transparency signals 404 obtained by coding based on separate coding parameters.

According to the fourteenth embodiment, the decoder 413 is provided for decoding the coded parameter signals 405 resulting from coding a pixel value coding parameter and a transparency coding parameter together, to regenerate the respective parameters, and thus the coded pixel value signals 401 and the coded transparency signals 404 are decoded based on the pixel value coding parameter 402 and transparency coding parameter 403 which are both decoded; therefore, according to the coded parameter signals 405 obtained by coding a pixel value coding parameter and a transparency coding parameter together and thus transmitted efficiently, coded pixel value signals and coded transparency signals obtained by the coding based on the respective parameters can be decoded correctly.

Embodiment 15.

Figure 18:
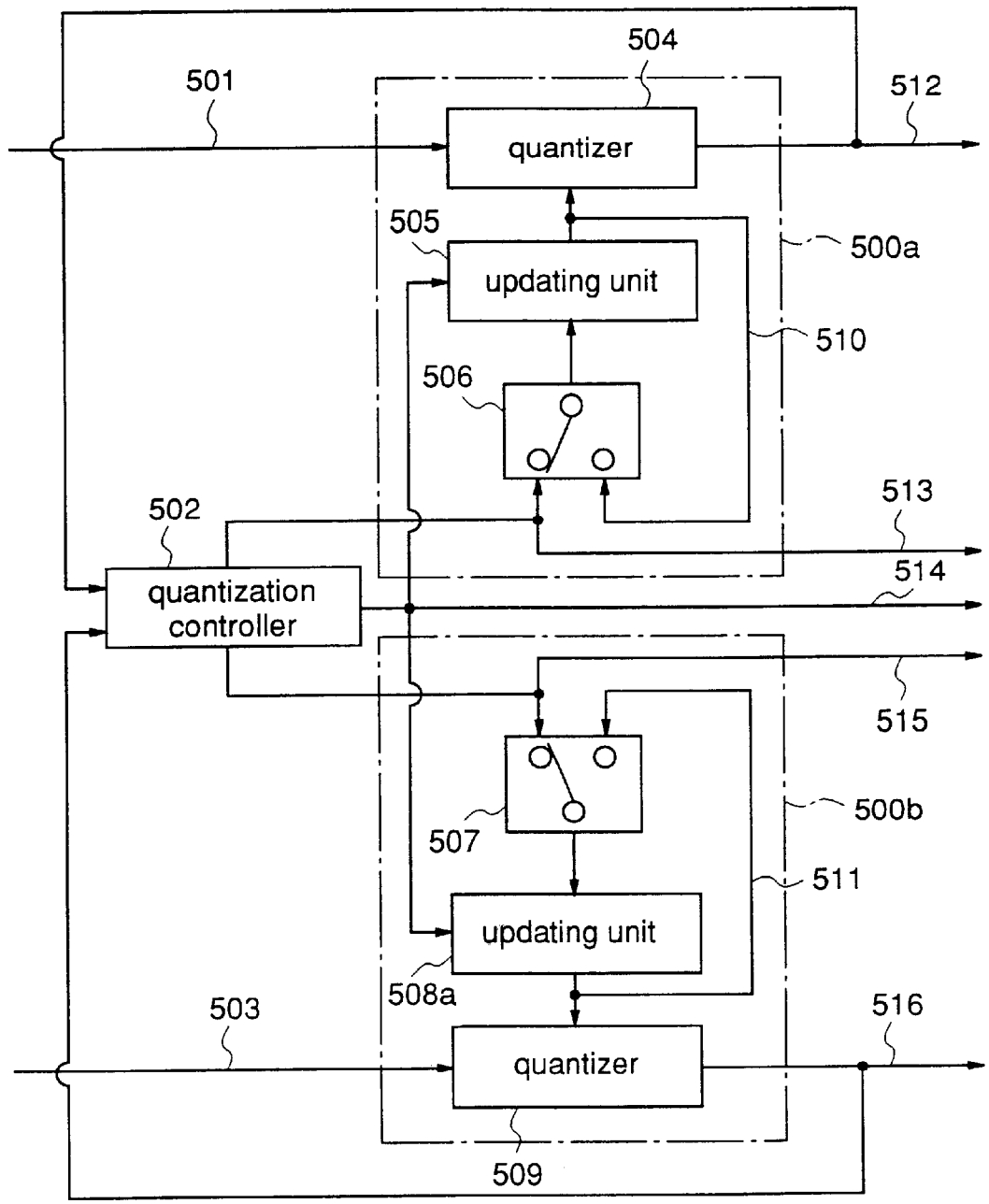
FIG. 18 is a block diagram showing a construction of an image quantization apparatus according to a fifteenth embodiment of the present invention.

FIG. 18 is a block diagram for explaining an image quantization apparatus according to a fifteenth embodiment of the present invention.

The image quantization apparatus 15 of this fifteenth embodiment is used for receiving, as input signals, pixel value signals 501 indicating pixel values of an image and transparency signals 503 indicating a composite ratio of pixel value for compositing the image with another image, and subjecting these signals to quantization process to output quantized pixel value signals 512 and quantized transparency signals 516, and this apparatus comprises a pixel value quantization section 500a for quantizing pixel value signals in accordance with a predetermined pixel value quantization step, a transparency quantization section 500b for quantizing transparency signals in accordance with a prescribed transparency quantization step, and a quantization controller 502 for controlling the respective quantization sections 500a and 500b.

On the basis of the quantized pixel value signals 512 and quantized transparency signals 516 as the outputs of the both quantization sections, the quantization controller 502 outputs, as control signals, a pixel value initial quantization parameter 513 and a quantization control parameter 514 to the pixel value quantization section 500a, and a transparency initial quantization parameter 515 and a quantization control parameter 514 to the transparency quantization section 500b. The pixel value initial quantization parameter 513 is an initial value of a pixel value quantization parameter which determines the pixel value quantization step, and the transparency initial quantization parameter 515 is an initial value of a transparency quantization parameter which determines the transparency quantization step. Furthermore, the quantization control parameter 514 is information for updating the pixel value quantization parameter and the transparency quantization parameter.

The pixel value quantization section 500a comprises: a quantizer 504 for quantizing the pixel value signals 501 in accordance with a predetermined pixel value quantization step, to output quantized pixel value signals 512; an updating unit 505 for updating a pixel value quantization parameter 510 which determines the pixel value quantization step on the basis of a pixel value initial quantization parameter 513 and a quantization control parameter 514, and outputting the updated ones to the quantizer 504; and a selector 506 for selecting one of the pixel value initial quantization parameter 513 and the pixel value quantization parameter 510 and outputting it to the updating unit 505.

Moreover, this pixel value quantization section 500a updates a pixel value quantization parameter 510 which determines a quantization step for pixel value signals, for each first processing unit, e.g., for each image, and further updates the same for each second processing unit which is smaller than the first processing unit, e.g., for each of the segmented block regions of an image. In other words, the selector 506 selects a pixel value initial quantization parameter 513 such that the pixel value quantization parameter 510 can be initialized by the updating unit 505 immediately before the initial quantization process for first processing unit, and then selects a pixel value quantization parameter 510 such that the pixel value quantization parameter 510 can be updated by the updating unit 505 before this process for first processing unit is completed.

The transparency quantization section 500b comprises: a quantizer 509 for quantizing the transparency signals 503 in accordance with a predetermined transparency quantization step to output quantized transparency signals 516; an updating unit 508a for updating a transparency quantization parameter 511 which determines the transparency quantization step, based on a transparency initial quantization parameter 515 and a quantization control parameter 514, and outputting them to the quantizer 509; and a selector 507 for selecting one of the transparency initial quantization parameter 515 and the transparency quantization parameter 511 and outputting it to the updating unit 508a.

Further, this transparency quantization section 500b updates a transparency quantization parameter 511 which determines a quantization step for transparency signals, for each first processing unit, e.g., for each image, and further updates the same for each second processing unit which is smaller than the first processing unit, e.g., for each of the segmented block regions of an image. In other words, the selector 507 selects a transparency initial quantization parameter 514 such that initialization of a transparency quantization parameter 511 can be performed by the updating unit 508a immediately before the first quantization process for first processing unit, and then selects a transparency quantization parameter 511 such that the transparency quantization parameter 511 can be updated by the updating unit 508a until this process for first processing unit is completed.

Note that at the regeneration side, the quantized pixel value signals 512 and the quantized transparency signals 516 are composited after inverse quantization process to obtain image signals for displaying an image.

Although in the above description an image is used as the first processing unit and a segmented block region of an image (small region) is used as the second processing unit, a plurality of images may be used as the first processing unit, and in this case, the second processing unit corresponds to an image, for example.

Next, the operation will be described.

When pixel value signals 501 and transparency signals 503 are supplied to the image quantization apparatus 15 of the fifteenth embodiment, in the pixel value quantization section 500a, the pixel value signals 501 are quantized by the quantizer 504, in accordance with a quantization step corresponding to a pixel value quantization parameter 510, and output as quantized pixel value signals 512.

In the transparency quantization section 500b, the transparency signals 503 are quantized by the quantizer 509, in accordance with a quantization step corresponding to a transparency quantization parameter 511, and output as quantized transparency signals 516.

At this time, in the quantization controller 502, a pixel value initial quantization parameter 513 which is an initial value of a pixel value quantization parameter 510 corresponding to each image (first processing unit), and a transparency initial quantization parameter 515 which is an initial value of a transparency quantization parameter 511 corresponding to each image (first processing unit) are obtained, and simultaneously, a quantization control parameter 514 for controlling updating of the respective quantization parameters are obtained.

In the selector 506 of the pixel value quantization section 500a, a pixel value initial quantization parameter 513 is selected such that initialization of this pixel value quantization parameter can be performed by the updating unit 505 until the quantization process of the first block region (second processing unit) of an image (first processing unit), and then a pixel value quantization parameter 510 is selected such that this pixel value quantization parameter 510 can be updated for each block region by the updating unit 505 until the quantization process of every block region in the image is completed.

In the selector 507 of the transparency quantization section 500b, as in the case of the selector 506, a transparency initial quantization parameter 515 is selected such that initialization of a transparency quantization parameter can be performed by the updating unit 508a until the quantization process for a first block region (second processing unit) of an image (first processing unit), and then a transparency quantization parameter 511 is selected such that this transparency quantization parameter 511 can be updated for each block region by the updating unit 508a until the quantization process for every block region in the image is completed.

Further, parallel to the processes performed by the quantization section and the selector, in the updating unit 505 of the pixel value quantization section 500a, one of the pixel value initial quantization parameter 513 and the pixel value quantization parameter 510, which is selected by the selector 506, is updated based on the quantization control parameter 514, and the updated pixel value quantization parameter 510 is output to the quantizer 504. While the pixel value quantization parameter 510 is being selected by the selector 506, the pixel value quantization parameter 510 is updated for each block region (second processing unit) included in an image as a processing object (first processing unit).

In the updating unit 508a of the transparency quantization section 500b, as in the updating unit 505, one of the transparency initial quantization parameter 515 and the transparency quantization parameter 511, which is selected by the selector 507, is updated based on the quantization control parameter 514, and the updated pixel value quantization parameter 511 is output to the quantization section 504. While the pixel value quantization parameter 511 is being selected by the selector 507, the pixel value quantization parameter 511 is updated for each block region (second processing unit) included in an image as a processing object (first processing unit).

In accordance with the fifteenth embodiment, separate values are set as initial values of quantization parameters which determine the quantization step for pixel value signals and that for transparency signals, for each image (first processing unit), and a quantization parameter indicating a variation of a quantization parameter (control value) is determined for each block region included in each image (second processing unit), and using this quantization control parameter, the quantization parameters are both updated; therefore, the amount of information of quantized pixel value signals and that of quantized transparency signals can be feed-back controlled, thereby making the quantization processes respectively conform to pixel value signals and to transparency signals. As a result, the amount to be coded in the coding of quantized transparency signals can be reduced without degrading a picture quality of a composite image displayed by composite signals obtained by compositing pixel value signals and transparency signals, for example.

Although in the fifteenth embodiment the pixel value quantization section 500a comprises the quantizer 504, the updating unit 505, and a selector 506, and the transparency quantization section 500b comprises the quantizer 509, the updating unit 508b, and the selector 507, respectively, the pixel value quantization section 500a and the transparency quantization section 500b may share a single quantizer, a single updating unit, and a single selector by time sharing or other methods.

In addition, although in the fifteenth embodiment the updating units 505 and 508a are constructed to keep updating a quantization parameter for pixel value signals and that for transparency signals for each block region, it is not necessary to keep updating the quantization parameter for pixel value signals and that for transparency signals.

For example, by the method of constructing the quantization controller 502 so that information indicating a necessity of updating is added to the content of the quantization control parameter 514, or so that the quantization control parameter 514 is output only when the quantization parameter is updated, one of the quantization parameter for pixel value signals and that for transparency signals is not necessary to be updated depending on a content of the information added to the quantization control parameter 514, or according to whether the quantization control parameter 514 is output or not.

Further, although in the fifteenth embodiment the concrete construction of the updating unit is not illustrated, any construction may be utilized if it can update only a quantization step according to the content of the quantization control parameter 514.

For example, in one of concrete updating methods, a variation (control value) of a quantization control parameter included in the content of the quantization control parameter 514 is added to or multiplies a quantization parameter.

Although in the fifteenth embodiment a description is given on the assumption that the updating of the quantization parameter in the updating unit is always performed by the same updating method, in the updating of the quantization parameter, the updating method may be changed according to the information on the updating method output from the quantization controller.

Although in the fifteenth embodiment the updating unit 505 of the pixel value quantization section 500a and the updating unit 508a of the transparency quantization section 500b utilize the same updating method, these updating units 505 and 508a can update a quantization step by the different methods.

For example, as an updating unit of a transparency quantized section 500b, an updating unit 508 may be used which updates a transparency quantization parameter by weighting it in respect to a pixel value quantization parameter using a method in which a process of multiplying quantization control parameter by a ratio between a pixel value initial quantization parameter and transparency initial quantization parameter is performed and the result of the multiplication is added to a transparency quantization parameter.

Figure 19:
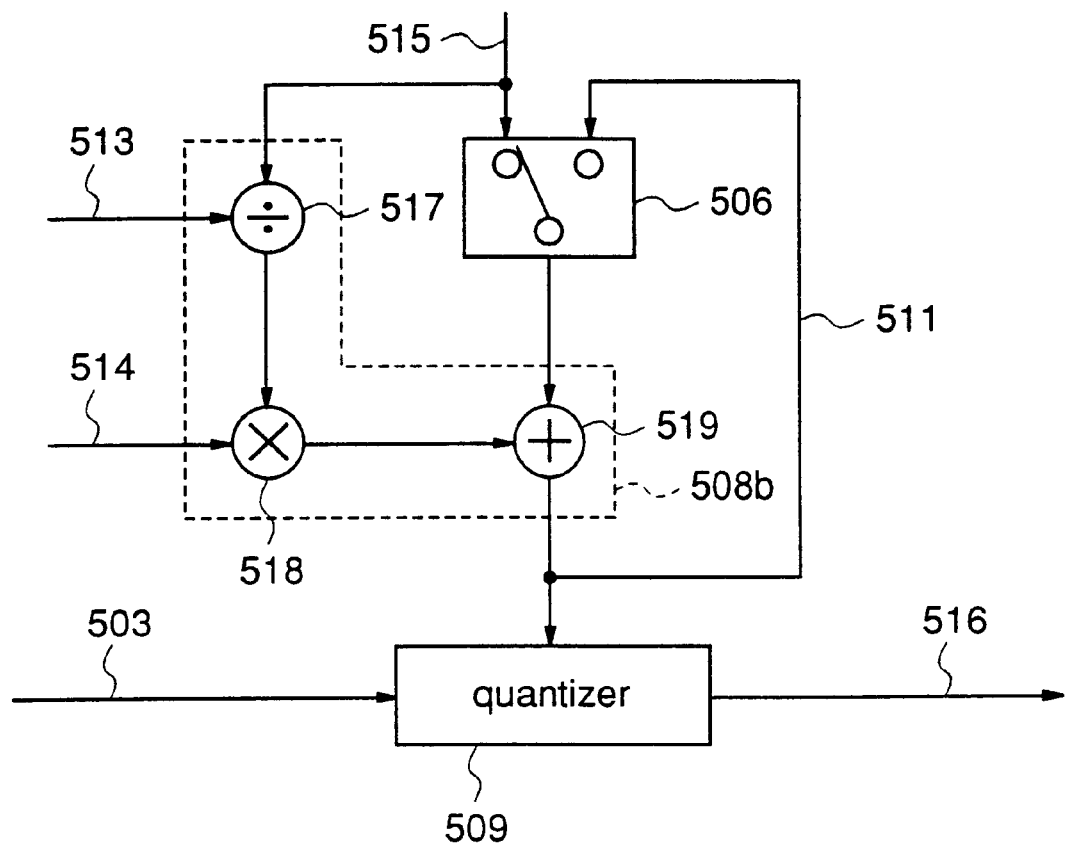
FIG. 19 is a block diagram showing constructions of a selector, an updating unit, and a quantizer of the image quantization apparatus of the fifteenth embodiment.

FIG. 19 is a block diagram for explaining a concrete construction of this updating unit 508. As shown in FIG. 19, the updating unit 508b comprises: a divider 517 for dividing a transparency initial quantization parameter 515 by a pixel value initial quantization parameter 513; a multiplier 518 for performing multiplying of the quantization control parameter 514 by the two quantization parameters which are the output from the divider 517; and an adder 519 for adding the output of the multiplier 518 to the output of the selector 506.

In the updating unit 508b, when a pixel value initial quantization parameter 513 and a transparency initial quantization parameter 515 are input with a quantization control parameter 514, in the divider 517, a division process is performed in which the transparency initial quantization parameter 515 is divided by a pixel value initial quantization step 513, and signals indicating a ratio between the pixel value initial quantization parameter 513 and the transparency initial quantization parameter 515 are output from the divider 517. Following this, in the multiplier 518, the ratio between the both quantization parameters and the quantization control parameter 514 are subjected to multiplication process to obtain the product of the ratio and the parameter. The resultant product is then added to the transparency quantization parameter 511, thereby updating the transparency quantization parameter 511.

Furthermore, in the fifteenth embodiment, a pixel value initial quantization parameter 513 and a transparency initial quantization parameter 515 are set in the quantization control unit assuming that there is no particular correlation between these parameters, but the two initial quantization parameters are not necessary to be set separately in the quantization control unit and the both initial quantization parameters may be set utilizing the correlation between them.

For example, when there is a correlation between the two initial quantization parameters, the quantization control unit is not necessarily constructed to output the two initial quantization steps, and the quantization control unit may be used having a construction in which correlation information indicating a correlation between an initial quantization parameter and the other initial quantization parameter is output with the other initial quantization parameter. Especially when there is a certain correlation between the both initial quantization parameters, it is not necessary to output the information about the correlation from the quantization control unit, and only one of the initial quantization parameters may be output.

Furthermore, although the fifteenth embodiment shows a case in which the input signals of the image quantization apparatus are pixel value signals and transparency signals, the pixel value signals and transparency signals subjected to conversion process such as frequency conversion may be used as the input signals to the image quantization apparatus.

Embodiment 16.

Figure 20:
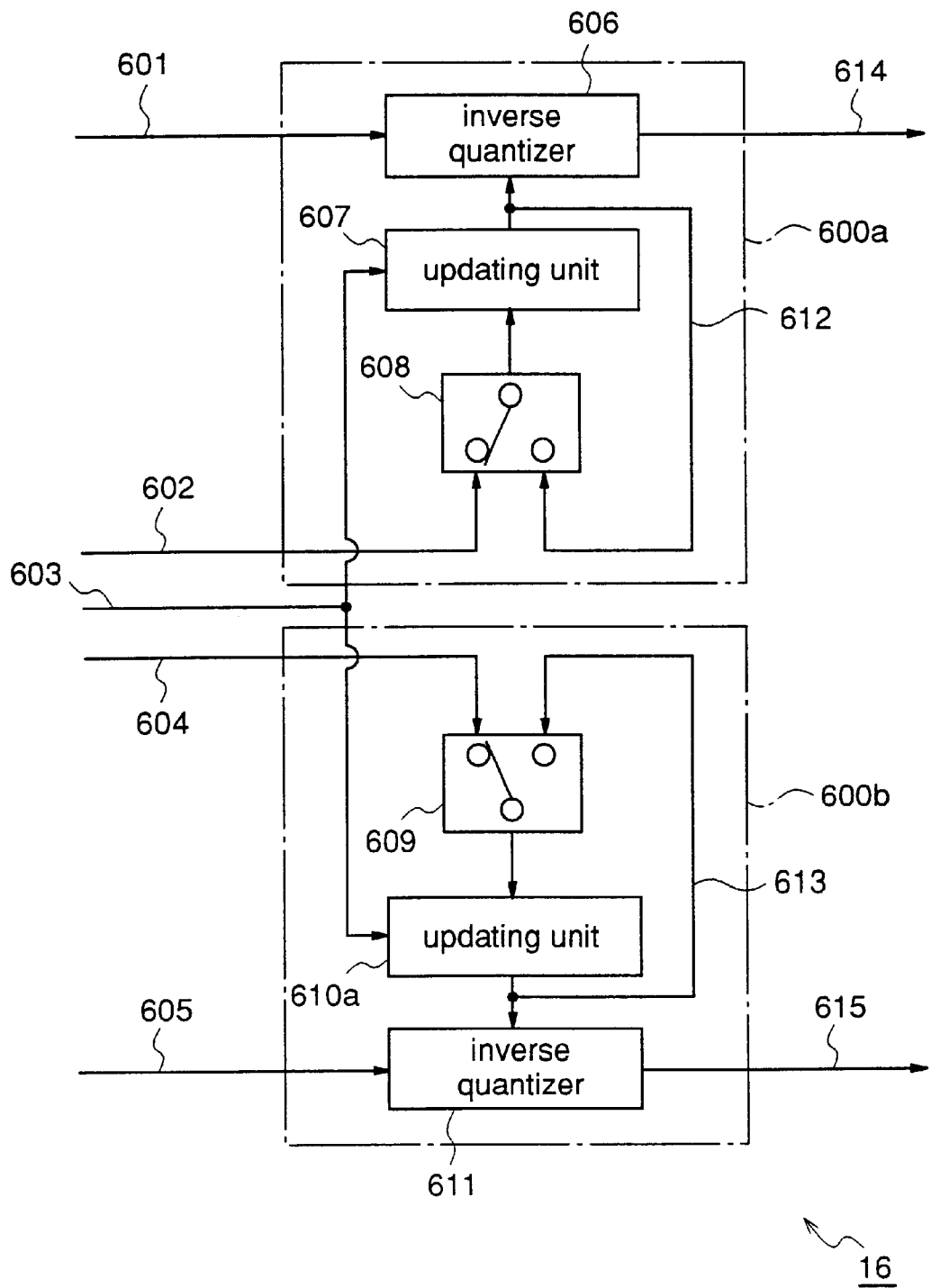
FIG. 20 is a block diagram showing a construction of an image inverse quantization apparatus according to a sixteenth embodiment of the present invention.

FIG. 20 is a block diagram for explaining an image inverse quantization apparatus according to a sixteenth embodiment of the present invention.

The image quantization apparatus 16 of the sixteenth embodiment is used for receiving, as input signals, quantized pixel value signals 601 resulting from quantizing pixel value signals indicating a pixel value of an image and quantized transparency signals 605 resulting from quantizing transparency signals indicating a composite ratio of pixel value for compositing the image and another image, subjecting these quantized signals to inverse quantization process to output pixel value signals 614 and transparency signals 615, and comprises a pixel value inverse quantization section 600a for inversely quantizing the quantized pixel value signals 601 in accordance with a prescribed pixel value quantization step and a transparency inverse quantization section 600b for inversely quantizing the quantized transparency signals 605 in accordance with a prescribed transparency quantization step.

The pixel value inverse quantization section 600a includes an inverse quantizer 606 for quantizing the quantized pixel value signals 601 in accordance with a prescribed pixel value quantization step to output pixel value signals 614, an updating unit 607 for updating a pixel value quantization parameter 612 which decides the pixel value quantization step on the basis of a pixel value initial quantization parameter 602 and a quantization control parameter 603 which are fed externally, and outputting the updated parameter to the inverse quantizer 606, and a selector 608 for selecting one of the pixel value initial quantization parameter 602 and the pixel value quantization parameter 612 and outputting the selected parameter to the updating unit 607. The pixel value initial quantization parameter 602, the pixel value quantization parmeter 612, and the quantization control parameter 603 correspond to the pixel value initial quantization parameter 513, the pixel value quantization parameter 510, and the quantization control parameter 514, respectively.

The pixel value inverse quantization section 600a updates the pixel value quantization parameter 612 for each first processing unit, e.g., for each image, and further updates the same for each second processing unit which is smaller than the first processing unit, e.g., for each segmented block region of one image. That is, the selector 608 selects the pixel value initial quantization parameter 602 so that initialization of the pixel value initial quantization parameter 612 is performed by the updating unit 607 immediately before first inverse quantization process in the first processing units, and then selects the pixel value quantization parameter 612 so that the pixel value quantization parameter 612 is updated by the updating unit 607 until the process in the first processing units is completed.

The transparency inverse quantization section 600b includes: an inverse quantizer 611 for inversely quantizing the quantized transparency signals 605 in accordance with a prescribed transparency quantization step and outputting transparency signals 615; an updating unit 610a for updating the transparency quantization parameter 613 which decides the transparency quantization step, on the basis of the transparency initial quantization parameter 604 and the quantization control parameter 603 which are externally input, and a selector 609 for selecting one of the transparency initial quantization parameter 604 and the transparency quantization parameter 613 and outputting the selected parameter to the updating unit 610a. The transparency initial quantization parameter 604 and the transparency quantization parameter 613 correspond to the transparency initial quantization parameter 515 and the transparency quantization parameter 511 of the fifteenth embodiment, respectively.

The transparency quantization section 600b is used for updating the transparency quantization parameter 613 which decides a quantization step for transparency signal for each first processing unit, e.g., for each image, and further updates the same for each second processing unit which is smaller than the first processing unit, for example, for each segmented block region of one image. That is, the selector 609 is used for selecting the transparency initial quantization parameter 604 so that the transparency quantization parameter 613 is initialized by the updating unit 610a immediately before first inverse quantization process of the first processing unit and then selecting the transparency quantization parameter 613 so that the transparency quantization parameter 613 is updated by the updating unit 610a until process for the first processing unit is completed.

Note that the quantized pixel value signals 601 and the quantized transparency signals 605 are composited after inverse quantization process, resulting in image signals for representing one image.

As described above, one image is used as the first processing unit and a segmented block region (small region) of one image is used as the second processing unit, respectively, but plural images may be used as the first processing unit, and in this case, the second processing unit corresponds to one image, for example.

Next, the operation will be described.

When the quantized pixel value signals 601 and the quantized transparency signals 605 are fed to the image inverse quantization apparatus 16 of the sixteenth embodiment, in the pixel value inverse quantization section 600a, the quantized pixel value signals 601 are inversely quantized in accordance with the quantization step according to the pixel value quantization parameter 612 by the inverse quantizer 606 and output as the pixel value signals 614.

In the transparency inverse quantization section 600b, as in the pixel value inverse quantization unit 600a, quantized transparency signals 605 are inversely quantized in accordance with the quantization step according to the transparency quantization parameter 613 by the inverse quantizer 611 to output transparency signals 615.

At this time, in the selector 608 of the pixel value inverse quantization section 600a, the pixel value initial quantization parameter 602 from the external is selected so that initialization of the pixel value initial quantization parameter is performed in the updating unit 607 immediately before first inverse quantization process to a first block region (second processing unit) of an image (first processing unit), and then, the pixel value quantization parameter 612 is selected so that the pixel value quantization parameter 612 is updated in the updating unit 607 until quantization process is completed for every block region in the image.

In the selector 609 of the transparency quantization section 600b, as in the selector 608, a transparency initial quantization parameter 604 from the external is selected so that the initialization of the transparency quantization parameter is performed by the updating unit 610a immediately before inverse quantization process to a first block region (second processing unit) of an image (first processing unit), and then the transparency quantization parameter 613 is selected so that the transparency quantization parameter 613 is updated by the updating unit 610a for each block region until inverse quantization process is completed for every block region in the image.

In the updating unit 607 of the pixel value inverse quantization section 600a, concurrently with the processes performed by the inverse quantizer and the selector, one of the pixel value initial quantization parameter 602 and the pixel value quantization parameter 612, which is selected by the selector 608, is updated on the basis of the quantization control parameter 603 and the updated pixel value quantization parameter 612 is output to the inverse quantizer 606. While the pixel value quantization parameter 612 is being selected by the selector 608, the pixel value quantization parameter 612 is updated for each block region (second processing unit) included in an image (first processing unit) to be processed.

In the updating unit 610a of the transparency inverse quantization section 600b, one of the transparency initial quantization parameter 604 and the transparency quantization parameter 613, which has been selected by the selector 609, is updated on the basis of the quantization control parameter 603 and the updated transparency quantization parameter 613 is output, as in the updating unit 607. While the transparency quantization parameter 613 is being selected by the selector 609, the transparency quantization parameter 613 is updated for each block region (the second processing unit) included in an image (the first processing unit) to be processed.

As described above, in accordance with the sixteenth embodiment, separate values are received for each image (first processing unit) as initial values of quantization parameters which decide the quantization steps of quantized pixel value signals and quantized transparency signals, respectively, and simultaneously a quantization control parameter indicating variation of the quantization parameter (control value) is received for each block region (second processing unit) included in each image and used to update the two quantization parameters; therefore, quantized signals resulting from quantizing pixel value signals and transparency signals in accordance with the optimal quantization steps are inversely quantized properly to generate pixel value signals and transparency signals, and from composite signals consisting of the pixel value signals and transparency signals obtained by the inverse quantization, composite image of high quality can be regenerated.

In the sixteenth embodiment, the pixel value inverse quantization section 600a comprises the inverse quantizer 606, the updating units 607, and the selector 608, and the transparency inverse quantization section 600b comprises the inverse quantizer 611, the updating unit 610a, and the selectors 609, respectively, but a quantizer, an updating unit, and a selector may be shared by the pixel value inverse quantization section 600a and the transparency inverse quantization unit section 600b by time sharing or the like.

In addition, although the updating units 607 and 610a are respectively used for updating the quantization parameter for quantized pixel value signals or quantized transparency signals for each block region continuously, the quantization parameter for quantized pixel value signals or quantized transparency signals is not required to be updated continuously.

For example, updating of the quantization parameter for quantized pixel value signals or quantized transparency signals may not be performed depending on a content of information added to the quantization control parameter 603, or whether the quantization control parameter 603 is input or not, by a method such as adding information indicating necessity of updating to a content of the quantization control parameter 603 which is externally input, or receiving the quantization control parameter 603 from the external only when the quantization parameter is updated.

Furthermore, in the sixteenth embodiment, the updating method for use in coding the quantized pixel value signals 601 and quantized transparency signals 605 is used for updating the quantization parameter, although the concrete construction of the updating unit is not provided. If the information on updating method is transmitted from a coding side to a decoding side, the quantization parameter is updated according to an updating method indicated by the transmitted information; if the updating methods for use are of a same type, predetermining an updating method is preferable.

For example, as a concrete method for updating the quantization step, applicable is a method in which a variation of the quantization step (control value) included in a content of the quantization control parameter 603 is multiplied with the quantization parameter or added to the quantization parameter.

Further in the sixteenth embodiment, a description is given of a case in which the quantization parameter is updated using a same updating method, but updating of the quantization parameter may be changed in accordance with information on the updating method which is input externally.

Further in the sixteenth embodiment, a description is given of a case in which the updating unit 607 of the pixel value quantization section 600a and the updating unit 610a of the transparency quantization section 600b use the same updating method, but the updating units 607 and 610a may update the quantization step using separate methods.

For example, as an updating unit of the transparency quantization section 600b, an updating unit 610b may be provided which updates a transparency quantization parameter by weighing it to a pixel value quantization parameter in a method of performing a process of multiplying a ratio of a pixel value initial quantization parameter to a transparency initial quantization parameter by a quantization control parameter and adding the multiplied result to the transparency quantization parameter.

Figure 21:
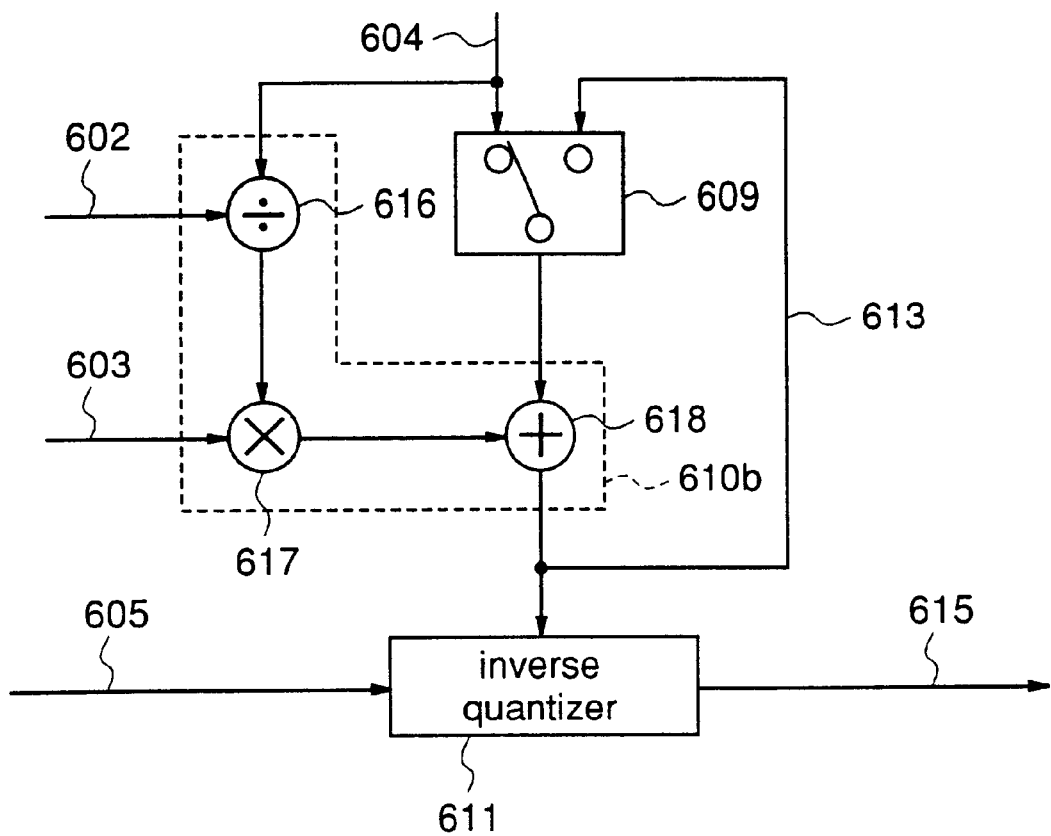
FIG. 21 is a block diagram showing constructions of a selector, an updating unit, and an inverse quantizer of the image inverse quantization apparatus of the sixteenth embodiment.
Figure 22:
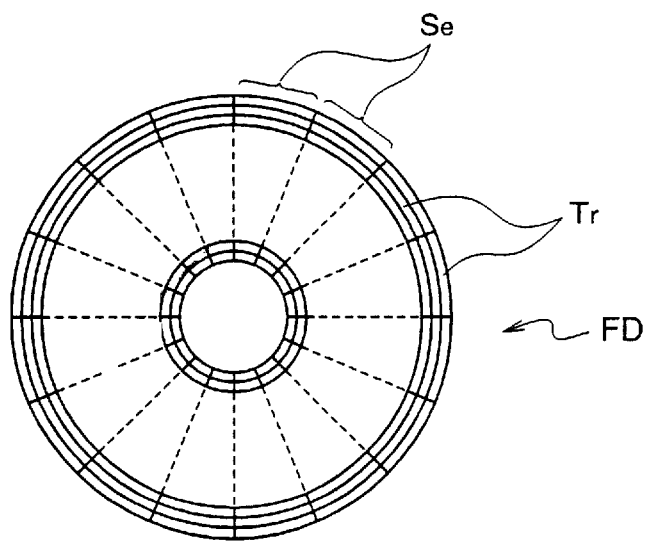
FIGS. 22(a), 22(b), and 22(c) are diagrams for explaining a data recording medium which stores a program for implementing the processes for image signals in the respective image processing apparatuses of the first to sixteenth embodiments using a computer.
Figure 22:
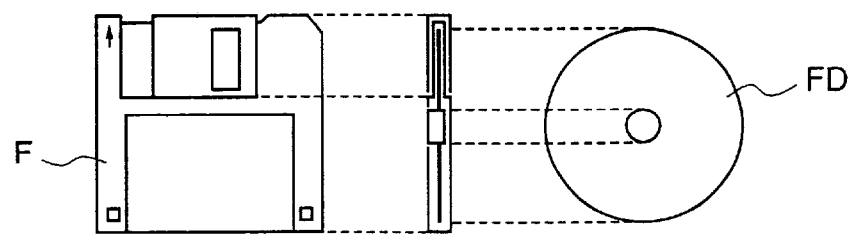
Figure 22:
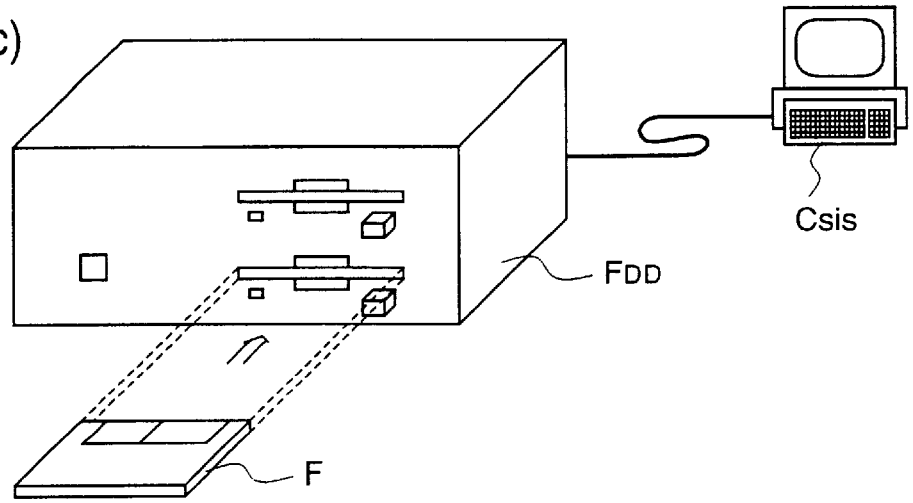

FIG. 21 is a block diagram for explaining the concrete construction of the updating unit 610b. As shown in the FIG. 21, the updating unit 610b comprises a divider 616 for dividing the transparency initial quantization parameter 604 by the pixel value initial quantization parameter 602, a multiplier 617 for performing multiplication of the ratio of the two quantization parameters as outputs of the divider 616 by the quantization control parameter 603, and an adder 618 for adding an output of the multiplier 617 to an output of the selector 609.

When the pixel value initial quantization parameter 604 and the transparency initial quantization parameter 602 are input to the updating unit 610b with the quantization control parameter 603, division process in which the transparency initial quantization parameter 604 is divided by the pixel value initial quantization step 602 is performed in the divider 616, and from which divider, signals indicating the ratio of the transparency initial quantization parameter 604 to the pixel value initial quantization parameter 602 is output. Then, in the multiplier 617, a process in which the ratio of the quantization parameters is multiplied by the quantization control parameter 603 to compute a product of these parameters. The product is then added to the transparency quantization parameter 613 by means of the adder 618, whereby the transparency quantization parameter 613 is updated.

In the sixteenth embodiment, there is no special correlation between the pixel value initial quantization parameter 602 and the transparency initial quantization parameter 604 in the quantization controller, which is not intended as limiting.

For example, if there is a correlation between the two initial quantization parameters, it is not necessary to receive the both parameters as inputs and information indicating what correlation is established between one initial quantization parameter and the other initial quantization parameter may be input with one of the initial quantization parameters. Especially if a certain correlation is always available, it is not necessary to receive the information on correlation and only one of the initial quantization parameters may be received from the external.

The input signals 601 and 605 of the image inverse quantization apparatus of the sixteenth embodiment need not be signals resulting from direct quantization of pixel value signals and transparency signals, respectively, and may be the signals which are the pixel value signals and transparency signals quantized after conversion of pixel value signals and transparency signals by a conversion method such as frequency conversion.

Further, by recording a signal processing program for implementing the construction of the image coding apparatus or the image decoding apparatus, or the construction of the image quantization apparatus or the image inverse quantization apparatus shown in the above embodiments in a data recording medium such as a floppy disk, it is possible to perform a signal processing including coding, decoding, quantization, inverse quantization and the like in a standalone computer system with ease.

FIG. 22(a) is a diagram for explaining a case in which coding or decoding process, quantization or inverse quantization process of the above-described embodiments are performed in a computer system by using a floppy disc which stores the signal processing program.

FIG. 22(b) illustrates a front appearance and a cross-section of a floppy disc, and the floppy disc itself. FIG. 22(a) illustrates a physical format of the floppy disk, i.e., a recording medium body. The floppy disc FD is stored in a case F, and in a surface of the disc, plural tracks Trs are formed concentrically from outer to inner radius thereof, each track being divided into 16 sectors Se in an angle direction. Therefore, in the floppy disc which stores the program, data of the signal processing program is recorded in an assigned region on the floppy disc FD.

FIG. 22(c) illustrates a construction for recording and reproducing of the signal processing program on the floppy disc FD. In the case of recording the signal processing program in the floppy disc FD, the data of the signal processing program is written thereto through the floppy disc drive from the computer system Cs. In another case of constructing the image decoding apparatus, the image quantization apparatus, or the image inverse quantization apparatus in a computer system by a signal processing program in a floppy disc, the program is read from the floppy disc by the floppy disc drive and transferred to the computer system.

Although in the description a floppy disc is used as the data recording medium, an optical disc can be used as the medium, too. In addition, the recording medium is not limited to them and an IC card, ROM cassette or the like may be used as long as they can record a program.

In the first to fourth and seventh to eleventh embodiments, the encoders 111 and 113a of the first and third embodiments, the encoders 111 and 113b of the second and fourth embodiments, the encoders 311a and 312a of the seventh and eighth embodiments, the encoders 311b and 312b of the ninth and tenth embodiments, the encoders 311c and 312c of the eleventh and twelfth embodiments are respectively provided as separate units, but units of the same function of the above embodiments may be assigned to a coding process for pixel value signals and a coding process for transparency signals and shared in these coding processes by time sharing or the like.

The decoders 211 and 213 of the fifth and sixth embodiments, and the decoders 411 and 412 of the thirteenth and fourteenth embodiments are respectively provided as separate units, but units of the same function of the above embodiments may be assigned to a decoding process for pixel value signals and a decoding process for transparency signals, respectively, and shared in these decoding processes by time sharing or the like.

Industrial Availability

As should be appreciated from the foregoing description, the image coding apparatus and the image coding method, the image decoding apparatus and the image decoding method, the quantization control method and the inverse quantization control method, and the data recording medium according to the present invention allow improvement of coding efficiency in compression process for image signals and are very useful for implementing image coding process or image decoding process in a system in which image signals are transmitted or recorded; especially, they are suitable for compression and expansion processes for moving pictures conforming to standard such as MPEG.

What is claimed is:

1. An image coding apparatus which receives pixel value signals indicating a pixel value of an image and transparency signals indicating a composite ratio of pixel value for compositing the image and another image as input signals and performs coding to the pixel value signals and the transparency signals, said image coding apparatus comprising:

a pixel value encoder for coding the pixel value signals to output coded pixel value signals, and outputting a pixel value coding parameter indicating control information on coding process for the pixel value signals;

a coding controller for generating a transparency coding parameter indicating control information on coding process for the transparency signals on the basis of the pixel value coding parameter, and outputting transparency coding control signals indicating a relation between the pixel value coding parameter and the transparency coding parameter; and a transparency encoder for coding the transparency signals in accordance with the transparency coding parameter to output coded transparency signals.

2. The image coding apparatus of claim 1 wherein, the transparency encoder includes:

a storage means for storing decoded transparency signals resulting from decoding the coded transparency signals;

a prediction signal producing unit for predicting transparency signals as objects of coding process to produce transparency prediction signals on the basis of the decoded transparency signals stored in the storage means;

a subtracter for subtracting the transparency prediction signals from the transparency signals as the objects of coding process and outputting transparency difference signals;

a difference encoder for coding the transparency difference signals to output coded transparency difference signals;

a local decoder for decoding the coded transparency difference signals to output decoded difference signals; and an adder for adding the decoded difference signals to the transparency prediction signals and outputting a resulting addition value to the storage means as decoded transparency signals.

3. The image coding apparatus of claim 1 wherein, the pixel value encoder includes:
a pixel value frequency converter for performing frequency conversion to the pixel value signals; and
a pixel value quantizer for quantizing an output of the pixel value frequency converter, and
the transparency encoder includes:
a transparency frequency converter for performing frequency conversion to the transparency signals; and
a transparency quantizer for quantizing an output of the transparency frequency converter,
a value of a quantization step for use in quantizing the transparency signals in the transparency quantizer being controlled on the basis of a value of a quantization step for use in quantizing pixel value signals in the pixel value quantizer.

4. The image coding apparatus of claim 2 wherein, the pixel value encoder includes:
a pixel value frequency converter for performing frequency conversion to the pixel value signals; and
a pixel value quantizer for quantizing an output of the pixel value frequency converter, and
the difference encoder includes:
a transparency frequency converter for performing frequency conversion to the transparency difference signals; and
a transparency quantizer for quantizing an output of the transparency frequency converter,
a value of a quantization step for use in quantizing frequency components of the transparency difference signals in the transparency quantizer being controlled on the basis of a value of a quantization step for use in quantizing pixel value signals in the pixel value quantizer.

5. The image coding apparatus of claim 1 wherein, the pixel value encoder includes:
a pixel value frequency converter for performing frequency conversion to the pixel value signals, to output plural pixel value frequency components; and
a pixel value quantizer for quantizing each of the plural pixel value frequency components, and
the transparency encoder includes:
a transparency frequency converter for performing frequency conversion to the transparency signals to output plural transparency frequency components; and
a transparency quantizer for quantizing each of the plural transparency frequency components,
a value of a quantization step for use in quantizing respective transparency frequency components in the transparency quantizer being controlled for each transparency frequency component on the basis of control information for controlling quantization process for pixel value frequency components in the pixel value quantizer.

6. The image coding apparatus of claim 2 wherein, the pixel value encoder includes:
a pixel value frequency converter for performing frequency conversion to the pixel value signals to output plural pixel value frequency components; and
a pixel value quantizer for quantizing each of the plural pixel value frequency components, and the difference encoder includes:
a transparency frequency converter for performing frequency conversion to the transparency difference signals to output plural transparency difference frequency components; and
a transparency quantizer for quantizing each of the plural transparency difference frequency components,
a value of a quantization step for use in quantizing each transparency difference frequency component in the transparency quantizer being controlled for each transparency difference frequency component on the basis of control information for controlling quantization process for each pixel value frequency component in the pixel value quantizer.

7. A method of coding images in which not only pixel value signals indicating a pixel value of an image but transparency signals indicating a composite ratio of pixel value for compositing the image and another image are coded, said method comprising the steps of:
coding the pixel value signals on the basis of a pixel value coding parameter indicating control information on coding process for the pixel value signals;
deciding a transparency coding parameter indicating control information on coding process for the transparency signals on the basis of the pixel value coding parameter; and
coding the transparency signals on the basis of the transparency coding parameter.

8. An image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but a pixel value coding parameter indicating control information on coding process for the pixel value signals and transparency coding control signals indicating a relation between the pixel value coding parameter and a transparency coding parameter indicating control information on coding process for the transparency signals, and performs decoding to the coded pixel value signals and the coded transparency signals, said apparatus comprising:
a pixel value decoder for performing decoding to the coded pixel value signals in accordance with the pixel value coding parameter and outputting decoded pixel value signals;
a decoding controller for generating the transparency coding parameter on the basis of the pixel value coding parameter and the transparency coding control signals to output the transparency coding parameter; and
a transparency decoder for decoding the coded transparency signals in accordance with the transparency coding parameter to output decoded transparency signals.

9. The image decoding apparatus of claim 8 wherein, the transparency decoder includes:
a storage means for storing decoded transparency signals as an output thereof;
a difference decoder for decoding coded transparency difference signals resulting from coding transparency difference signals as difference between the transparency signals and transparency prediction signals corresponding thereto, to output the decoded transparency difference signals;
a prediction signal producing unit for producing transparency prediction signals corresponding to coded transparency difference signals as objects of decoding process, from decoded transparency signals stored in the storage means; and an adder for adding the decoded transparency difference output to transparency prediction signals and outputting the addition value to the storage means as the decoded transparency signals.

10. The image decoding apparatus of claim 8 wherein, the pixel value decoder includes:

a pixel value inverse quantizer for inversely quantizing the coded pixel value signals; and a pixel value inverse frequency converter for performing inverse frequency conversion to an output of the pixel value inverse quantizer, the transparency decoder includes:

a transparency inverse quantizer for inversely quantizing the coded transparency signals; and a transparency inverse frequency converter for performing inverse frequency conversion to an output of the transparency inverse quantizer, a value of a quantization step for use in inversely quantizing the coded transparency signals in the transparency inverse quantizer being controlled on the basis of a value of a quantization step for use in inversely quantizing coded pixel value signals in the pixel value inverse quantizer.

11. The image decoding apparatus of claim 9 wherein, the pixel value decoder includes:

a pixel value inverse quantizer for inversely quantizing the coded pixel value signals; and a pixel value inverse frequency converter for performing inverse frequency conversion to an output of the pixel value inverse quantizer;

the difference decoder includes:

a transparency inverse quantizer for inversely quantizing the coded transparency difference signals; and a transparency inverse frequency converter for performing inverse frequency conversion to an output of the transparency inverse quantizer;

a value of a quantization step for use in inversely quantizing the coded transparency difference signals in the transparency inverse quantizer being controlled on the basis of a value of a quantization step for use in inversely quantizing coded pixel value signals in the pixel value inverse quantizer.

12. The image decoding apparatus of claim 8 wherein, the pixel value decoder includes:

a pixel value inverse quantizer for inversely quantizing the coded pixel value signals; and a pixel value inverse frequency converter for performing inverse frequency conversion to an output of the pixel value inverse quantizer; and the transparency decoder includes:

a transparency inverse quantizer for inversely quantizing plural frequency components obtained by performing frequency conversion to transparency signals and included in the coded transparency signals; and a transparency inverse frequency converter for performing inverse frequency conversion to an inversely quantized output corresponding to each frequency component from the transparency inverse quantizer, a value of a quantization step for use in inversely quantizing each frequency component in the transparency inverse quantizer being controlled for each frequency component on the basis of control information for controlling inverse quantization process for coded pixel value signals in the pixel value inverse quantizer.

13. The image decoding apparatus of claim 9 wherein, the pixel value decoder includes:

a pixel value inverse quantizer for inversely quantizing the coded pixel value signals; and a pixel value inverse frequency converter for performing inverse frequency conversion to an output of the pixel value inverse quantizer, the difference decoder includes:

a transparency inverse quantizer for inversely quantizing each of plural frequency components obtained by performing frequency conversion to transparency difference signals and included in the coded transparency difference signals;

a transparency inverse frequency converter for performing inverse frequency conversion to an inversely quantized output corresponding to each frequency component from the transparency inverse quantizer; and a value of a quantization step for use in inversely quantizing each frequency component in the transparency inverse quantizer being controlled for each frequency component on the basis of control information for controlling inverse quantization of coded pixel value signals in the pixel value inverse quantizer.

14. A method of decoding images in which coded pixel value signals resulting from coding pixel value signals indicating a pixel value of an image and coded transparency signals resulting from coding transparency signals indicating a composite ratio of pixel value for compositing the image and another image are decoded, said method comprising the steps of:

generating a transparency coding parameter indicating control information on coding process for the coded transparency signals on the basis of a pixel value coding parameter indicating control information on coding process for the coded pixel value signals and transparency coding control signals indicating a relation between the pixel value coding parameter and the transparency coding parameter;

decoding the coded pixel value signals in accordance with the pixel value coding parameter; and decoding the coded transparency signals in accordance with the transparency coding parameter.

15. An image coding apparatus which receives pixel value signals indicating a pixel value of an image and transparency signals indicating a composite ratio of pixel value for compositing the image and another image as input signals and performs coding to the pixel value signals and the transparency signals, said image coding apparatus comprising:

a pixel value encoder for coding the pixel value signals to output coded pixel value signals, and outputting a pixel value coding parameter indicating control information on coding process for the pixel value signals; and a transparency encoder for coding the transparency signals to output coded transparency signals and outputting a transparency coding parameter indicating control information on coding process for the transparency signals.

16. The image coding apparatus of claim 15 further comprising:

a coding controller for generating pixel value coding control signals for controlling coding process for the pixel value signals and transparency coding control signals for controlling coding process for the transparency signals on the basis of the coded pixel value signals and the coded transparency signals, respectively, so as to control the pixel value encoder and the transparency encoder in accordance with the pixel value coding control signals and the transparency coding control signals, respectively.

17. An image coding apparatus which receives pixel value signals indicating a pixel value of an image and transparency signals indicating a composite ratio of pixel value for compositing the image and another image as input signals and performs coding to the pixel value signals and the transparency signals, said image coding apparatus comprising:

a pixel value encoder for coding the pixel value signals to output coded pixel value signals, and outputting a pixel value coding parameter indicating control information on coding process for the pixel value signals;

a transparency encoder for coding the transparency signals to output coded transparency signals, and outputting a transparency coding parameter indicating control information on coding process for the transparency signals; and a parameter encoder for performing coding process to signals obtained on the basis of the pixel value coding parameter and the transparency coding parameter, to output coded parameter signals corresponding to the two coding parameters.

18. An image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but a pixel value coding parameter indicating control information on coding process for the pixel value signals and a transparency coding parameter indicating control information on coding process for the transparency signals, and performs decoding to the coded pixel value signals and the coded transparency signals, said apparatus comprising:

a pixel value decoder for decoding the coded pixel value signals in accordance with the pixel value coding parameter to output decoded pixel value signals; and a transparency decoder for decoding the coded transparency signals in accordance with the transparency coding parameter to output decoded transparency signals.

19. An image decoding apparatus which receives, as input signals, not only coded pixel value signals resulting from coding pixel value signals indicating a pixel value of an image and coded transparency signals resulting from coding transparency signals indicating a composite ratio of pixel value for compositing the image and another image, but coded parameter signals resulting from coding the signals obtained from two types of parameters, that is, a pixel value coding parameter indicating control information on coding process for the pixel value signals and a transparency coding parameter indicating control information on coding process for the transparency signals, and performs decoding to the coded pixel value signals and the coded transparency signals, said apparatus comprising:

a parameter decoder for decoding the coded parameter signals to regenerate the pixel value coding parameter and the transparency coding parameter;

a pixel value decoder for decoding the coded pixel value signals in accordance with the pixel value coding parameter to output decoded pixel value signals; and a transparency decoder for decoding the coded transparency signals in accordance with the transparency coding parameter to output decoded transparency signals.

20. A quantization control method in which, while controlling a pixel value quantization step for use in quantization process for pixel value signals indicating a pixel value of an image, and a transparency quantization step for use in quantization process for transparency signals indicating a composite ratio of pixel value for compositing the image and another image, quantization process is performed to the pixel value signals and the transparency signals, said method comprising the steps of:

initializing a pixel value quantization parameter which decides the pixel value quantization step and a transparency quantization parameter which decides the transparency quantization step for each first processing unit used in the quantization process; and updating the pixel value quantization parameter and the transparency quantization parameter for each second processing unit which is different from the first processing unit used in the quantization process.

21. An inverse quantization control method in which, while controlling a pixel value quantization step for use in inverse quantization process for quantized pixel value signals resulting from quantizing pixel value signals indicating a pixel value of an image, and a transparency quantization step in inverse quantization process for quantized transparency signals resulting from quantizing transparency signals indicating a composite ratio of pixel value for compositing the image and another image, inverse quantization process is performed to the quantized pixel value signals and the quantized transparency signals, said method comprising the steps of:

initializing a pixel value quantization parameter which decides the pixel value quantization step and a transparency quantization parameter which decides the transparency quantization step for each first processing unit in the inverse quantization process; and updating the pixel value quantization parameter and the transparency quantization parameter for each second processing unit which is different from the first processing unit in the inverse quantization process.

22. A data recording medium for storing a signal processing program, said signal processing program making a computer carry out a coding process performed by the image coding apparatus of claim 1 or 15 or a decoding process performed in the image decoding apparatus of claim 8 or 18.

23. A data recording medium for storing a signal processing program, said signal processing program making a computer perform a quantization process by the quantization control method of claim 20 or an inverse quantization process by the inverse quantization control method of claim 21.

* * * * *